US005579057A

United States Patent [19]
Banker et al.

[11] Patent Number: 5,579,057
[45] Date of Patent: Nov. 26, 1996

[54] DISPLAY SYSTEM FOR SELECTIVELY OVERLAYING SYMBOLS AND GRAPHICS ONTO A VIDEO SIGNAL

[75] Inventors: Robert O. Banker, Cumming; Cham Ith, Duluth; Kinney C. Bacon, Lawrenceville; David B. Burleson, Roswell, all of Ga.

[73] Assignee: Scientific-Atlanta, Inc., Norcross, Ga.

[21] Appl. No.: 369,867

[22] Filed: Jan. 5, 1995

Related U.S. Application Data

[63] Continuation of Ser. No. 73,404, Jun. 7, 1993, abandoned.

[51] Int. Cl.$^6$ .......................... H04N 5/262; H04N 5/272; H04N 5/278
[52] U.S. Cl. .................. 348/589; 348/7; 348/10; 348/12; 348/13; 348/569; 345/189; 345/192
[58] Field of Search ...................... 345/194, 195, 345/26, 187–189, 192, 23; 348/589, 569, 600, 586, 10, 12, 13, 7; 395/147; H04N 5/262, 5/272, 5/278

[56] References Cited

U.S. PATENT DOCUMENTS

| | | | |
|---|---|---|---|
| 3,539,999 | 11/1970 | Houldin et al. | 340/172.5 |
| 3,997,718 | 12/1976 | Ricketts et al. | 178/6.8 |
| 4,031,543 | 6/1977 | Holz | 358/86 |
| 4,146,877 | 3/1979 | Zimmer | 345/194 |
| 4,156,847 | 5/1979 | Tazawa et al. | 325/308 |
| 4,264,924 | 4/1981 | Freeman | 358/86 |
| 4,360,828 | 11/1982 | Briggs, Jr. et al. | 358/86 |
| 4,414,621 | 11/1983 | Bown et al. | 364/200 |
| 4,439,759 | 3/1984 | Fleming et al. | 340/703 |
| 4,439,760 | 3/1984 | Fleming | 340/799 |
| 4,439,784 | 3/1984 | Furukawa et al. | 358/86 |
| 4,451,701 | 5/1984 | Bendig | 179/2 TV |
| 4,475,123 | 10/1984 | Dumbauld et al. | 358/114 |
| 4,486,779 | 12/1984 | Marti | 358/147 |
| 4,489,344 | 12/1984 | Ikeda et al. | 358/22 |
| 4,494,142 | 1/1985 | Mistry | 358/118 |
| 4,510,568 | 4/1985 | Kishi et al. | 364/300 |
| 4,536,791 | 8/1985 | Campbell et al. | 358/122 |
| 4,575,579 | 3/1986 | Simon et al. | 178/4 |
| 4,586,035 | 4/1986 | Baker et al. | 340/712 |
| 4,586,158 | 4/1986 | Brandle | 364/900 |
| 4,591,845 | 5/1986 | Komatsu et al. | 345/23 |
| 4,622,589 | 11/1986 | Bell | 358/183 |
| 4,641,205 | 2/1987 | Beyers, Jr. | 360/33.1 |

(List continued on next page.)

FOREIGN PATENT DOCUMENTS

| | | | |
|---|---|---|---|
| 0190837 | 8/1986 | European Pat. Off. | H04N 7/087 |
| WO86/01962 | 3/1986 | WIPO | H04N 7/16 |

OTHER PUBLICATIONS

*M50455–XXXSP TV Screen Character and Pattern Display Controller Data Sheets*, by Mitsubishi, dated on or about Oct. 1987.

*Primary Examiner*—Victor R. Kostak
*Assistant Examiner*—Nathan J. Flynn
*Attorney, Agent, or Firm*—Banner & Allegretti, Ltd.

[57] ABSTRACT

A display system for the on screen display of information for a subscriber terminal of a subscription television system includes a display processor which can display information in the form of a display screen stored in a display memory. The display processor can be preprogrammed by the control processor with a plurality of display attributes including different symbol sets, different color palettes, whether the screen is to be a text screen, graphic screen or a combination of a text and graphics system, and the size and location of each screen display on the display area. The display processor includes a digital processor and an analog processor. The digital processor controls accessing the display data from the memory and converting it into timed digital pixels. The analog processor includes a digital to analog pixel converter which produces analog pixels from the digital pixels in a timed relation to an input video signal. The analog processor includes a multiplexer which substitutes the analog pixels for the pixels of the input video signal when display processor is active.

39 Claims, 24 Drawing Sheets

U.S. PATENT DOCUMENTS

| | | | |
|---|---|---|---|
| 4,658,290 | 4/1987 | McKenna et al. | 358/84 |
| 4,742,543 | 5/1988 | Frederiksen | 380/9 |
| 4,786,967 | 11/1988 | Smith, III et al. | 358/143 |
| 4,787,085 | 11/1988 | Suto et al. | 370/110.1 |
| 4,829,569 | 5/1989 | Seth-Smith et al. | 380/10 |
| 4,866,770 | 9/1989 | Seth-Smith et al. | 380/20 |
| 4,908,834 | 3/1990 | Wiedemer | 380/5 |
| 4,951,229 | 8/1990 | Di Nicola et al. | 345/187 |
| 4,963,994 | 10/1990 | Levine | 358/335 |
| 5,001,697 | 3/1991 | Torres | 364/521 |
| 5,091,936 | 2/1992 | Katznelson et al. | 380/19 |
| 5,227,614 | 7/1993 | Danielson et al. | 235/380 |
| 5,293,540 | 3/1994 | Trani et al. | 348/589 |
| 5,333,016 | 7/1994 | Tsutsumi | 348/589 |
| 5,341,474 | 8/1994 | Gelman et al. | 348/7 |

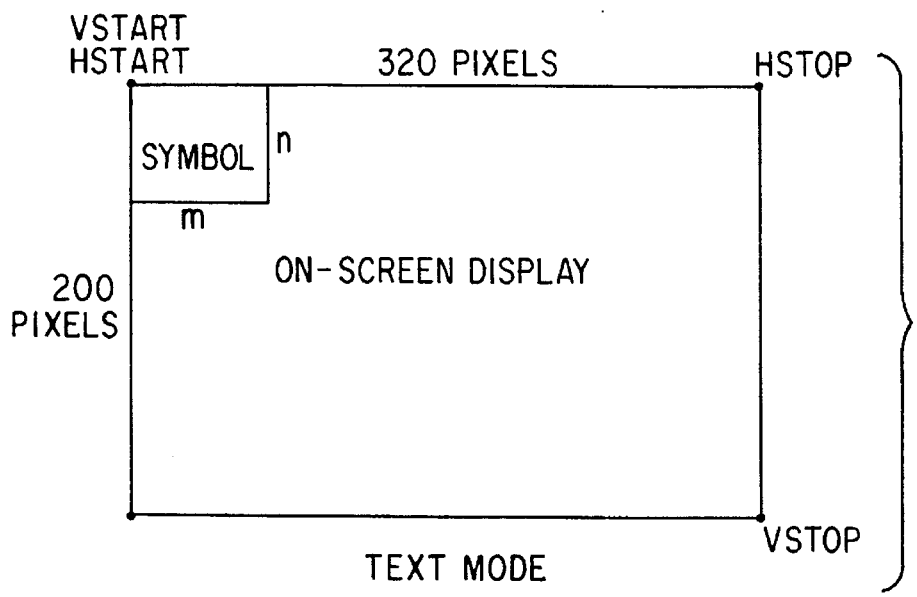
FIG. 3 TEXT MODE
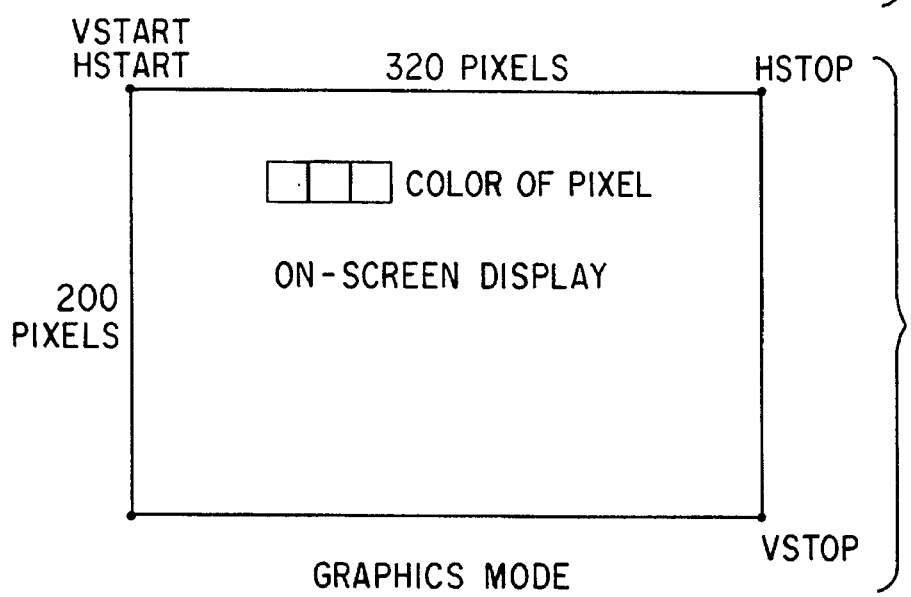
FIG. 4 GRAPHICS MODE
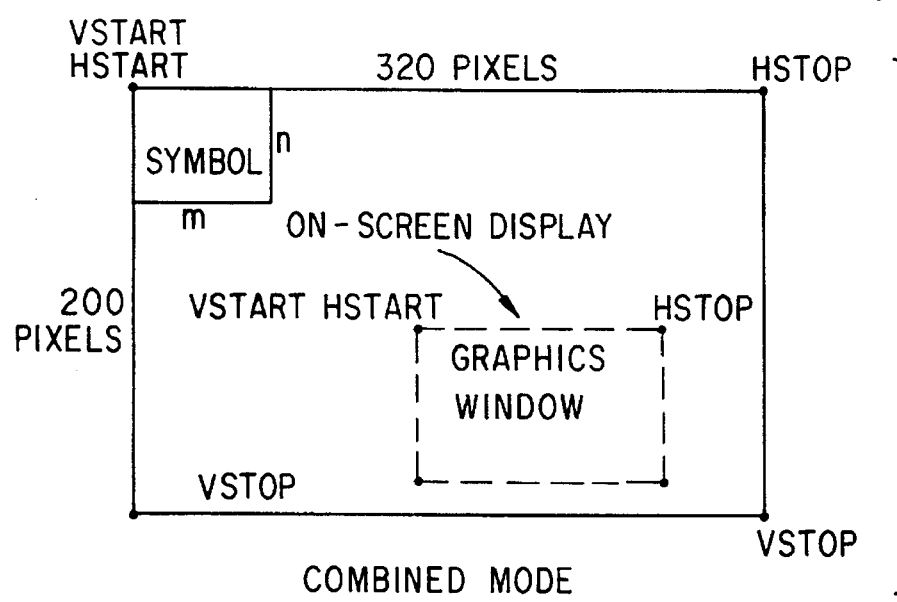
FIG. 5 COMBINED MODE

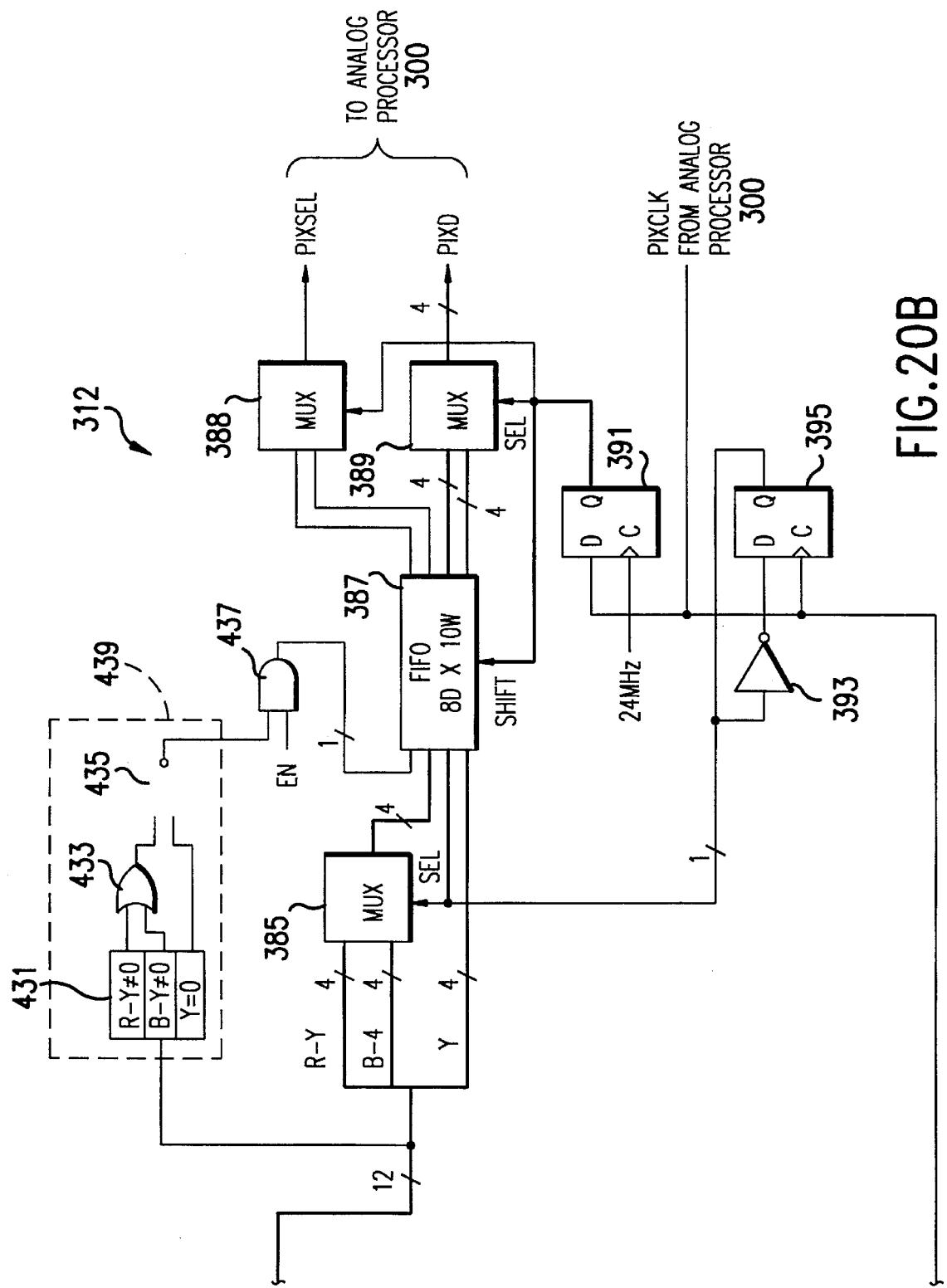

DISPLAY SYSTEM FOR SELECTIVELY OVERLAYING SYMBOLS AND GRAPHICS ONTO A VIDEO SIGNAL

This application is a continuation of application Ser. No. 08/073,404, filed Jun. 7, 1993 (now abandoned).

FIELD OF THE INVENTION

The invention pertains generally to a subscriber terminal for CATV or other subscription television systems and is more particularly directed to an on-screen display system for such subscriber terminals.

BACKGROUND OF THE INVENTION

The subscriber terminal, more commonly known as a set top terminal, is an integral component of subscription television systems. These subscription television systems can be cable television (CATV) systems, multi-point, multi-distribution subscription (MMDS) systems, or direct-to-home (DTH) systems. The terminals have conventionally provided the functions of tuning particular channels of the subscription system which are outside the subscriber's television receiver capability. Further, they provide conditional access to the particular subscription service through authorization codes and in many services provide tiering or authorization of particular channels of the service by descrambling.

More recently, the subscriber terminal has become user friendly by providing an interactive, on-screen display and other user functions that allow the subscriber to manipulate the cable service and his television receiver in additional ways. These features include such things as volume control, pay-per-view event confirmation, favorite channel listings, sleep timer features, parental control capability, program timers for recording VCR programs and other types of consumer friendly operational features.

In addition, some of the features found in newer television receivers can be provided for older receivers by the subscription terminal. For example, channel identity, mute and volume control functions can be accomplished by the subscriber terminal making the subscriber's television receiver appear to be a newer model with these capabilities.

An advantageous example of a subscriber terminal with these advanced consumer features is the Model 8600 series of subscriber terminals manufactured by Scientific-Atlanta, Inc. of Norcross, Ga.

These terminals generally provide on-screen displays by combining the video signal from a selected channel with an on-screen display video signal from a video generator prior to the remodulation of the combination to either Channels 3 or 4. The subscriber terminal generates timed control codes to the video generator which describe the various displays which are to be provided on the subscriber's television screen.

However, with the totality of the new features which are available in the advanced subscriber terminals, the flexibility and memory capability of the terminal for on-screen display has been exceeded. This is particularly the case in the area of providing specially defined characters or specially sized characters. Conventional video generator chips usually provide a limited set of characters and a single or severely restricted set of character fonts. For a truly flexible system, a bit-mapped or full graphics mode should be used. This type of graphic system however has been too memory and computationally intensive for subscriber terminals in the past. Further, there is generally no method for reprogramming a subscriber terminal to change the graphics capability of a display once it has been delivered to a subscriber. This makes the user interface extremely difficult to update or upgrade.

What is needed is an advanced display system which is flexible and powerful enough to support the advanced features available today in subscriber terminals and which will be capable of supporting the features which will be incorporated into the subscriber terminals of the future.

SUMMARY OF THE INVENTION

An improved on screen display system for a subscriber terminal is provided by the invention. The display system comprises a display processor and a display memory which is partitioned into a symbol screen definition section, a symbol set definition section, and a graphics screen definition section. The symbol screen definition section is programmable with a plurality of symbol pointers which select particular symbols from one or more of the symbol set definitions and the sequence of displaying those symbols. The graphics screen definition section of the memory is programmable with a pixel display of the entire screen. The display system is extremely flexible in that its many features allow on screen displays to be generated easily, manipulated easily, and displayed quickly with an optimal use of the memory and control processor resources of the subscriber terminal.

The display processor is utilized to process the display information from the display memory and convert the display data into an on screen display for the subscriber terminal. The display processor can produce a text or symbol display, a graphics display, or combinations of text and graphic displays. One feature of the system permits either a symbol display, graphics display, or a combination of both to be displayed on the display area. This flexibility permits pure symbols (all text) to be written, or text with an overlay of graphics, such as a logo or the like. Another feature allows each of the different types of displays to be of different sizes and positioned at various locations of the display area.

The display processor processes the display information into an on screen display in conjunction with a plurality of display attributes or parameters. The display parameters include information concerning the height and width of a defined set of symbols. The symbol definitions and the display parameters are programmable into the subscriber terminal memory which means there can be a multiplicity of symbol definitions sets to choose from, and each symbol set can be of a different size. The flexibility of allowing more than one symbol set to be defined and the ability to manage its size, allows the facile display of non-English character sets such as Chinese, Japanese, Arabic, etc. Thus, the symbol displays have an important use in generating text displays in various languages and character fonts. The symbols are provided as different sizes of arrays of pixels which can be formed into symbol sets, for example, to define an English language character set of a particular size and style.

In one preferred embodiment, the symbols can be arranged horizontally on the display in a plurality of symbol lines which can then be given line attributes. In this manner, single lines of text can be given a common denominator which can be changed by changing the line attribute without having to reprogram every character in a line. The line attributes which the invention provides, as by way of illustrative example, include variation of the symbol set definitions, the color of an underline for a character, and a palette selection for that underline color. By providing a method of varying the symbol sets for the symbol lines, each symbol line can be not only a different size or font of character, but even a different language. These several choices of line attributes can be displayed simultaneously on the same on-screen display. It is evident that many other line attributes could be provided in this manner.

Each symbol of a symbol set definition is defined as an array of pixels, mxn, which is stored in display memory as one or more bits corresponding to each pixel. In the preferred embodiment, the number bits of each pixel corresponds to a number of pixel attributes which can be represented by the separate states of that number of bits. For example, for a single bit per pixel, two states (two attributes) can be stored for each pixel. In the illustrated implementation, two bits per pixel are used to define the color attributes of the pixel for a symbol or character. The four states of the two bits allow the selection of either a foreground color, a background color, the color black, or the color white for each pixel. These choices produce a great flexibility in choosing a style or character font for a symbol in a minimum amount of memory which can then be easily colored in a multiplicity of hues and tints.

The symbol screen definition section of the display memory is programmed with pointers to the particular symbols which are to make up the display. The pointers address each symbol in one of the symbol set definitions. Additionally, in the illustrated implementation, the pointers also describe symbol attributes which are easier to describe for the individual symbols or for which changes may be desired without changing the symbol style (symbol definition). In the illustrated implementation the pointer contains a representation of the color of the symbol, a foreground mode bit, whether it should be underlined, and whether it should blink.

This produces a system where each pixel in each symbol can be one of four colors, either a black, white, or background color or a foreground color. Because the pointer of a symbol selects the pair of palette registers, it will choose the foreground and background colors for the symbol for example, a blue letter on a white background. To change such a color combination, a programmer selects a different color combination with the address of a different pair of palette registers. In the present display system, up to sixteen different color combinations can be stored for selection at any one time.

The pointer to the symbol definition also contains the foreground mode bit which allows for the effortless selection between white and black characters on multiple color backgrounds. If this bit is in one state, then colors are displayed normally. Alternatively, if this bit is in its other state, the effect of the colors of black and white are reversed for the foreground palette registers. If the entire foreground palette registers are loaded with the color white and the background palette registers are loaded with sixteen distinct colors, then either black or white characters can be displayed on sixteen different colored backgrounds. Only the foreground mode bit in the symbol pointer needs to be changed to select between white and black characters while the same symbol definition can be used.

The foreground mode bit works by inverting the luminance value of the particular palette register selected. Therefore, it further provides an effect for colored symbols. Setting this bit causes the intensity of colored symbol to be reversed such that bright characters will become dim and dim characters will become bright.

The display processor also provides a feature for displaying the symbols on a background of active video. Normally, the symbols have a foreground color for the symbol pixels of the symbol array and a background color for the background pixels of the symbol array. The symbol array pixels are then substituted for the pixels of active video and the foreground colors and background colors fill the screen, i.e., white letters on a blue background. However, the active video background feature inverts the choice of the symbol array pixel versus the active video pixel making the background pixels of the symbols appear transparent.

A unique method of making this selection is by assigning a particular color or group of colors to a pixel to be a transparent color. When that color is sensed, the display system, instead of attempting to convert that pixel into a color, selects the active video pixel for substitution. In a preferred implementation, the choice of the color to be a transparent pixel is an out of range color, for example, one where the luminance equals zero for nonzero chroma components R-Y or B-Y.

The graphic screens, which are pixel mapped arrays, may additionally use this feature. Because each pixel of a graphics screen has a defined color, that color can be selected as a transparent color which will cause the selection of the active video pixel. In this manner, the graphics screens can be easily overlayed on active video to show cutout portions of the active video and other special effects.

BRIEF DESCRIPTION OF THE DRAWINGS

These and other objects, features and aspects of the invention will be more clearly understood and better described if the following detailed description of the preferred embodiments is read in conjunction with the appended drawings wherein:

FIGS. 3–7 are a pictorial representation of the different modes of the on screen display system of the subscriber terminal illustrated in FIG. 2;

DETAILED DESCRIPTION OF THE PREFERRED EMBODIMENTS

Figure 1:
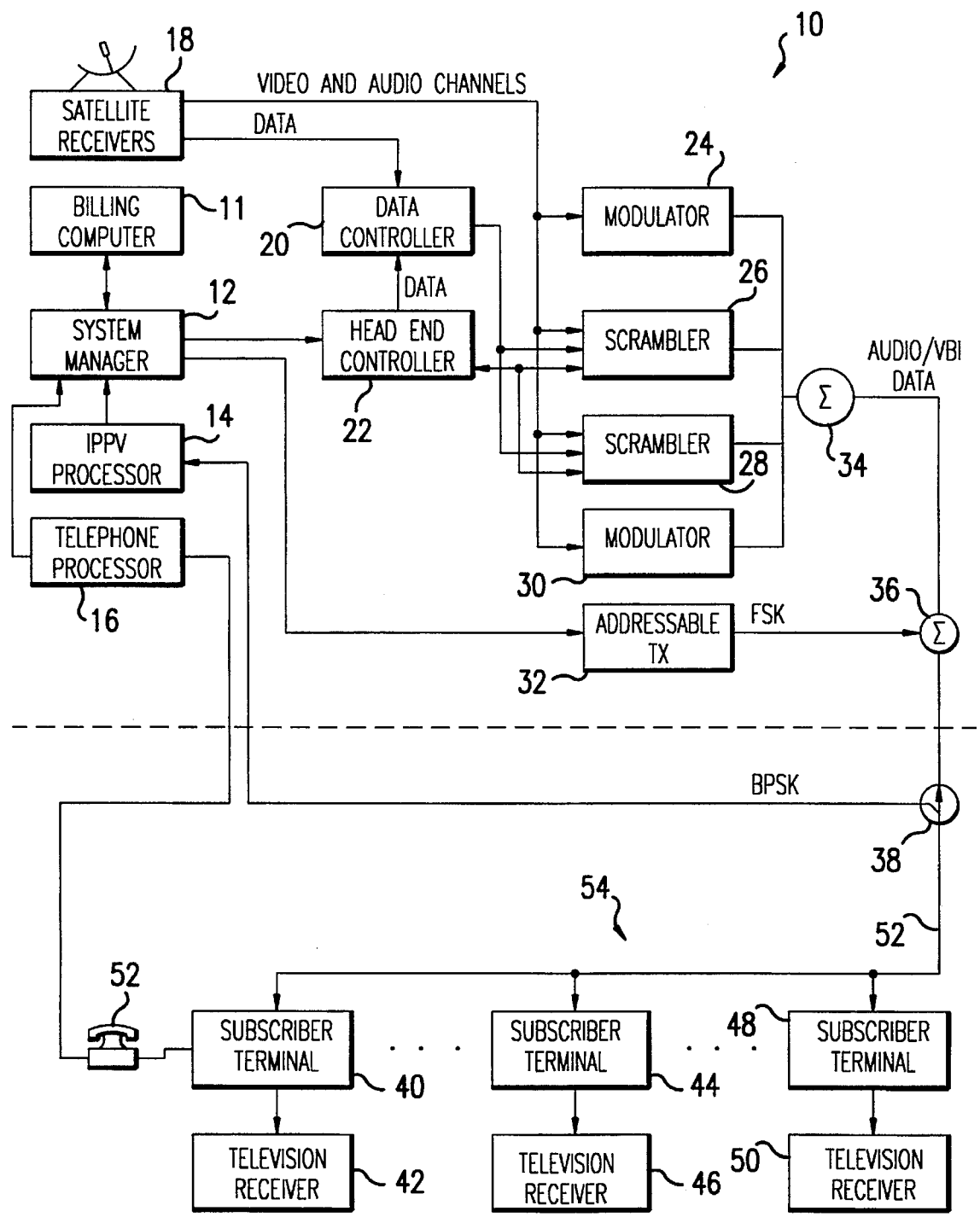
FIG. 1 is a system block diagram of a subscription television system of the CATV type which includes a multiplicity of subscriber terminals.

A subscription television system of the CATV type is more fully illustrated in FIG. 1. The subscription television system includes a headend 10 and a plurality of subscriber terminals 40, 44 and 48 which are connected over a distribution system 52. As is conventional, the distribution system 52 may include coaxial or optical fiber cable, system amplifiers, line extenders, etc. The headend 10 is under the supervision of a system manager 12 which controls a hardware controller, headend controller 22. A billing computer 11 communicates with the system manager 12 to authorize and transmit transactions to subscribers.

The television or other programming for the subscription system may come from a satellite downlink where it is decoded and demodulated by satellite receivers 18 into a number of channels. Each channel is either applied to a modulator 24 and 30 or a scrambler and modulator 26 and 28 which, under the control of the headend controller 22, remodulates the channels to the frequencies of the local subscription system channel line up. For a premium or restricted channel service (tiered, pay-per-view, or the like), some channels are scrambled by any of the known CATV methods by the scramblers and modulators 26 and 28. While the other channels can be transmitted without conversion. The program channels are then frequency division multiplexed onto the distribution system 52 by an RF combiner 34 as a broadband television signal. The plurality of channels of programming can then be transmitted over the distribution system 52 and supplied to each of the subscriber terminals 40, 44, and 48.

The scramblers and modulators 26 and 28 further may include the function of data insertion for its particular channel. This method of providing the data within the channel signal is generally termed in-band signaling. The data may be applied to any audio portion, video portion or both the audio and video portions in combination, or any other portion of the television channel. Many subscription television systems have amplitude modulated data pulses on the audio subcarrier. Further, in other subscription television systems, data may be inserted into the vertical and/or horizontal blanking intervals of the video portion.

The data which is inserted into the television channel in this manner can be conditional access data to globally or locally address and control the subscriber terminals 40, 44 and 48, on screen text data, or other types of information from the headend controller 22. Other data and information, such as electronic program guides and information services, can be inserted into the channels from a data controller 20. The data controller 20 can receive local data or national data from the satellite downlink through the satellite receiver 18.

In addition, data can be transmitted over the distribution system 52 by out-of-band signaling. In this mode, the system manager 12 accesses an addressable transmitter 32 with transactions to transmit this data. The addressable transmitter 32 may be used to modulate a data signal on a frequency not associated with the television programming. The broadband television programming of the cable systems has generally been applied from 50 Mhz to 550 Mhz and above, while out-of-band signaling systems have been used in non-video portions of these signals, such as at 108.2 Mhz with a frequency shift keying modulation technique. These transactions are combined with the broadband television signal at 36 and transmitted to the subscriber terminals 40, 44 and 48.

Transactions in the system are designated as addressed (to a particular subscriber terminal or group of subscriber terminals) or global (to all subscriber terminals). These transactions are in a standardized format which can be sent over any of the communication paths mentioned.

Signaling and data information may also flow in the reverse direction from the subscriber terminals to the headend via a reverse signaling path through the distribution system 52. In one form, the reverse signals are digital biphase shift keying (BPSK) modulated and applied to a frequency below 50 Mhz. The signals flow back from the subscriber terminals to an IPPV processor where they are decoded. In addition, any of the subscriber terminals 40, 44 and 48 may include a modem and telephone link 52 to a telephone processor 16 at the headend 10. The information from processors 14 and 16 are directed to the system manager 12, which communicates to the billing computer 11 to obtain authorization and billing information. The reverse signaling system has generally been used for ordering pay-pay-view (PPV) or impulse-pay-per-view (IPPV) events. In the future the reverse signal path may be used for any number of additional interactive services.

Figure 2A:
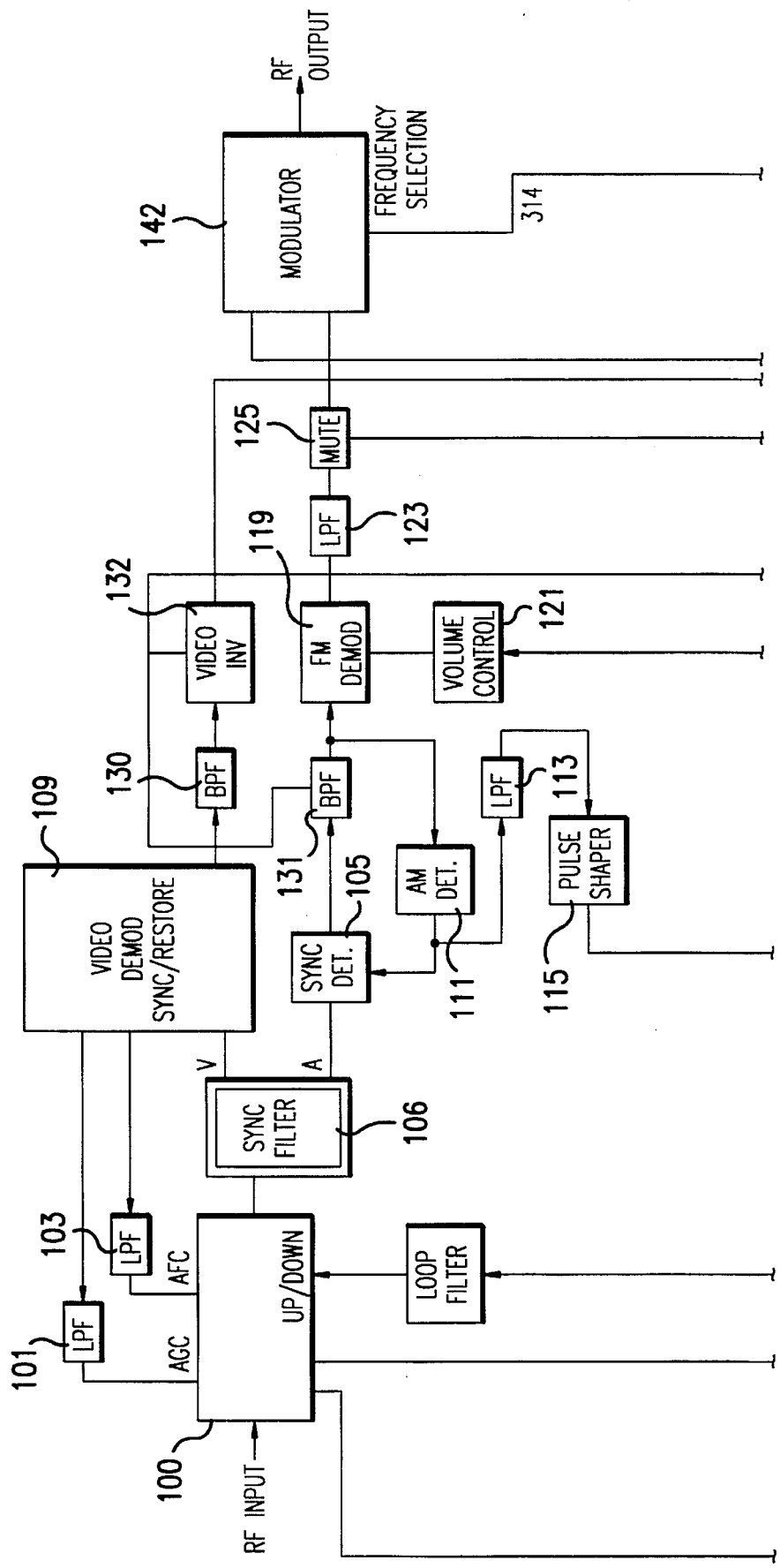
FIG. 2 is a detailed block diagram of one of the subscriber terminals of the system illustrated in FIG. 1.
Figure 2B:
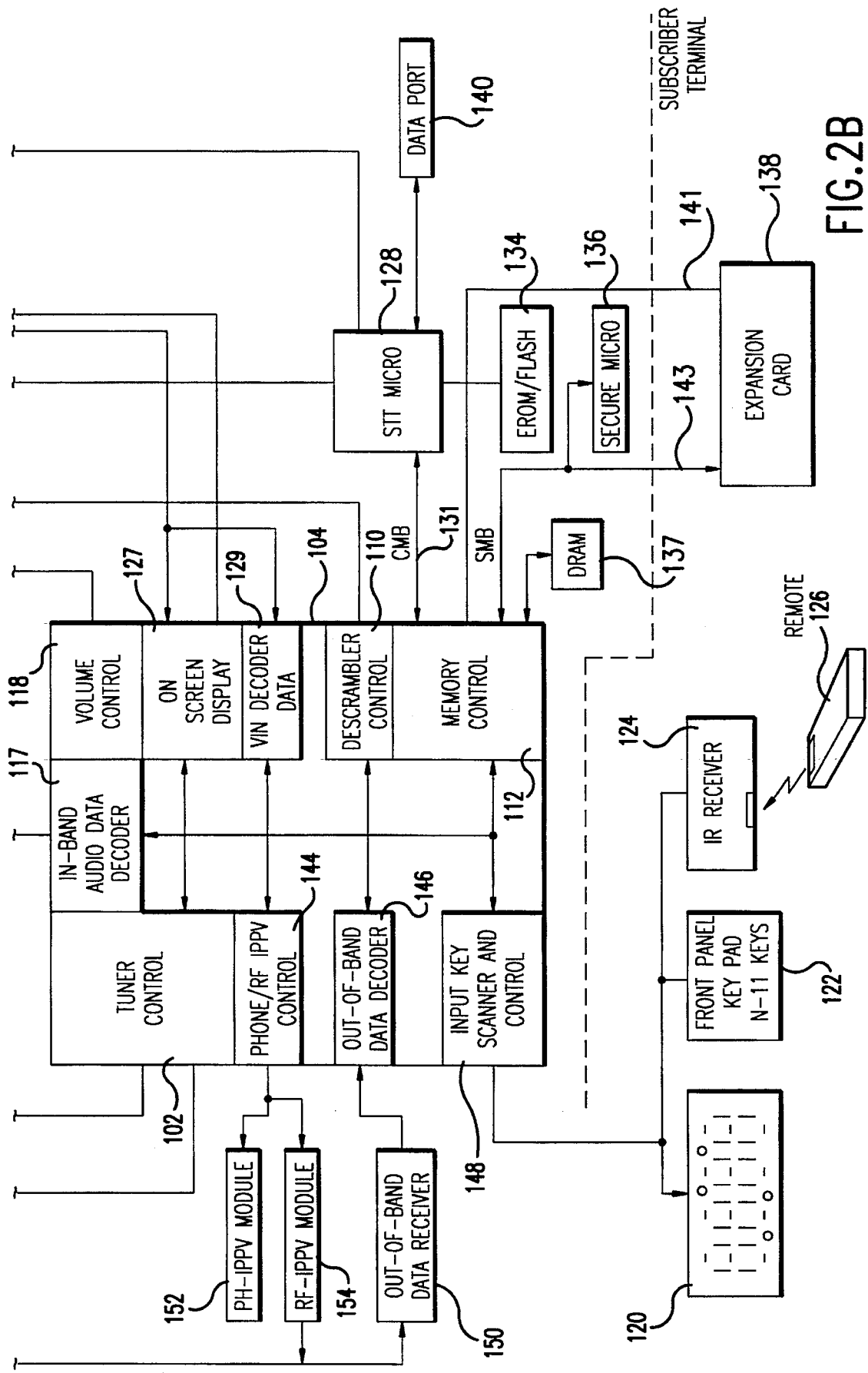
Figure 6:
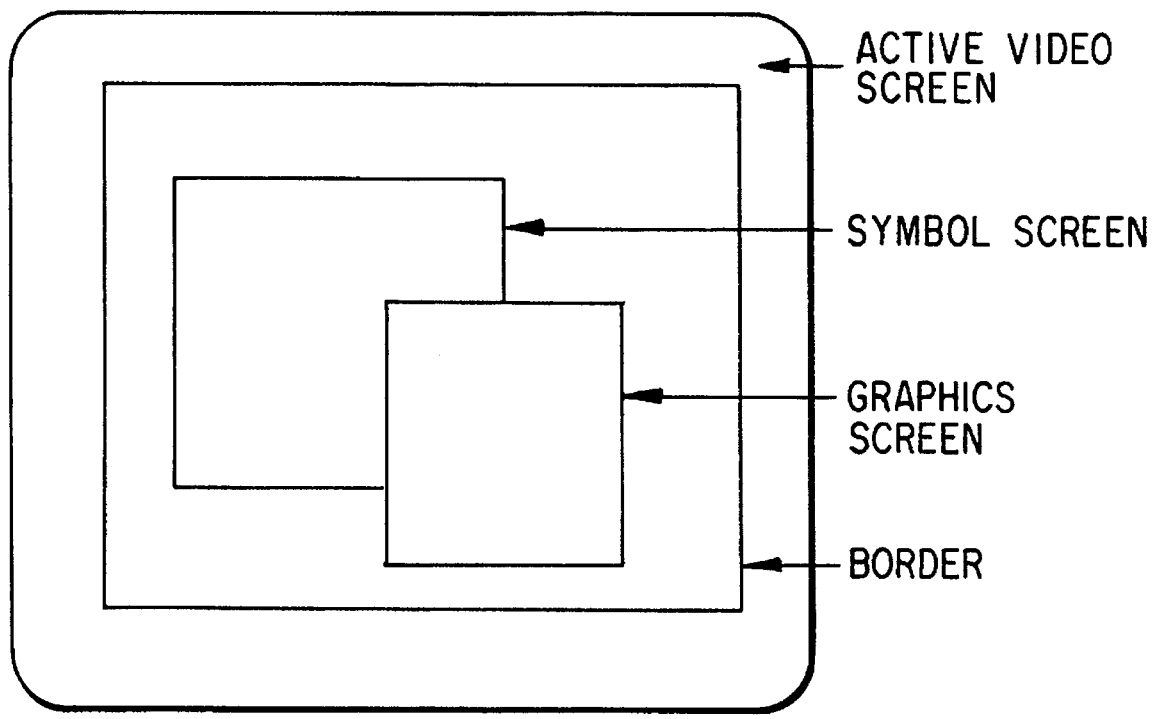

Referring to FIG. 2, a detailed block diagram of one of the subscriber terminals, for example, the one indicated as 40 of the subscription television system will now be described. The broadband television signal from signal distribution system 52 is received at the input of up/down converter or tuner 100. An out-of-band data receiver 150 is also coupled to the broadband input. Conventionally, the up/down converter 100 may include an input filter, such as a diplexer, to separate the 108.2 Mhz out-of-band signal and the broadband television signal. The up/down converter 100 can be tuned to a predetermined channel for receiving in-band video and audio data when not in use. The channel may be predetermined from the system manager 12 and, by one of the data transmission methods described herein, the predetermined channel identification can be stored in subscriber terminal 40.

When in use, the up/down converter 100 is tuned according to a channel entered by a subscriber via a user interface having an IR receiver 124, remote control 126 and terminal keypad 122. Up/down converter 100 uses a phase locked loop under the control of a tuning control 102 to convert the selected or predetermined default RF channel signal to a 45.75 Mhz intermediate frequency signal. A multifunction control circuit (MCC) 104, preferably an application specific integrated circuit (ASIC) combining many subscriber terminal control and data handling functions into a single package, is linked to up/down converter 100 by a bidirectional link to the tuner control 102. The link has one path for tuning and a return link for feedback control of the tuning process. A feedback signal for automatic gain control and one for automatic frequency control are transmitted to the up/down converter 100 through filters 101, 103, respectively from a video demodulator 109.

A filter, such as a SAW filter 106, filters the IF channel signal to split the signal into separate video and audio portions for further processing. The video portion is demodulated and descrambled by the video demodulator 109 under the control of a descrambler control 110 of the MCC 104. The video demodulator 109 performs the sync restoration (descrambling of the video signal) for sync suppression scrambling. The video signal then passes through a band pass filter 130 and to a video inverter 132 where inverse video inversion (descrambling) takes place. The descrambling of the video portion, whether sync suppression, sync inversion, video line inversion, etc. is under the control of the descrambler control 110 of the MCC 104. The descrambler control 100 provides the necessary timing signals, inversion axis levels, and whether the video is inverted or not to the video inverter 132 and supplies the necessary timing, restoration levels and identification of sync pulses to be restored to the demodulator 109. The descrambler control 110 usually receives such descrambling information from pulses as in-band audio data.

In the other path, the audio signal is converted from the 41.25 Mhz IF carrier to the intermodulation frequency of 4.5 Mhz by a synchronous detector 105. Feedback for automatic gain control of detector 105 is supplied from the output of band pass filter 131. The audio signal may then be demodulated by an FM demodulator 119. An amplitude modulation detector 111 performs pulse detection to recover the in-band audio data which are amplitude modulated onto the audio carrier. The recovered in-band pulses are supplied to an in-band audio data decoder 117 of MCC 104 for processing after being shaped by pulse shaper 115. The in-band data, except for descrambling data, is stored in DRAM 137 for buffering. Descrambler control 104 accesses descrambling data directly for the video descrambling operation.

Volume control of the audio signal is performed under the control of a volume control 118 of the MCC 104 and the microprocessor 128 as described in U.S. Pat. No. 5,054,071, incorporated herein by reference. After volume control the audio signal is passed through a low pass filter 123 and a mute switch 125. The output of the mute switch 125 is applied to a modulator 142.

The MCC 104 receives the video signal after demodulation and descrambling and detects the in-band video data from the VBI of the signal with a VBI decoder 129. The in-band video data is transmitted at a frequency on the order of known teletext systems, such as about 4.0 megabits per second, and a data clock provides an appropriate sampling frequency higher than the Nyquist rate according to well known techniques. The in-band decoder 129 stores the data. in DRAM 137 prior to processing by the microprocessor 128, the DRAM 128 serving as a data buffer.

The output of video inversion circuit 132 is also supplied to an on screen display control 127 of the MCC 104. The on screen display control 127 selectively generates on screen character and graphic displays in place of or overlaid on the video signal. The modulator 142 combines the video signal from the output of the on screen display control 127 and the audio signal from the output of the mute circuit 125 and converts the combined signal to the channel frequency selected by the microprocessor 128, such as channel ¾ for NTSC. The combined and remodulated signal is supplied as an RF output to a television receiver in well known manner.

A control microprocessor 128 controls the overall operation of the subscriber terminal 40. The subscriber communicates to and controls the microprocessor 128 through an interactive user interface with an on screen display. The user interface includes a keyboard 122 on the front panel of the subscriber terminal 40 and the remote 126 which generate subscriber control signals for channel tuning, volume level control, feature selection, and the like. These subscriber control commands are decoded by an input scanner and control 148 of MCC 104. The remote IR receiver 124 of the user interface receives the commands from the infrared (IR) or other remote control 126, as is well known in the art, and provides commands to the microprocessor 128. The user interface additionally includes a 4 digit, 7 segment LED display 120 which displays the tuned channel numbers and diagnostics.

When the keypad 122 or IR remote control 126 is utilized to select a command, the microprocessor 128 operates to execute the command. For example, this operation may be to instruct the tuner control 102 to appropriately control up/down converter 100 to tune a selected channel. The subscriber terminal interacts with the subscriber by providing numerous on screen displays which assist in the operation of the terminal. The on screen displays provide information and prompts to guide the subscriber through many of the complex features of the terminal.

The descrambler control 110 of the MCC 104 utilizes recovered descrambling data to generate appropriate control signals, for example, inversion control and equalizing, sync restoration or regeneration for descrambling, or otherwise restoring the input baseband television signal. A secure microprocessor 136 determines whether the descrambler control 110 of MCC 104 carries out descrambling on a particular channel or what form of descrambling is required at a particular time by interpreting the authorization and control data downloaded from the system manager 12 (by any of the three data transmission schemes discussed herein, out-of-band, in-band audio or in-band video) into the internal NVM memory of the device. The non-volatile memory (NVM) in the secure microprocessor 136 stores secure data, for example, authorization data, scrambled channel data, scrambling mode data, some terminal configuration data and other required data.

The control microprocessor 128 operates by running a control program which preferably is partially stored in a read-only memory internal to the processor and partially stored in a non-volatile memory such as Flash EPROM memory 134. In addition, the control program of the control microprocessor 128 may also reside in the non-volatile memory of an expansion card 138. The microprocessor 128 communicates with the non-volatile memory 134 and 138 via a memory bus 141 which has data, address, and control lines. In addition, the microprocessor 128 controls the data decoders 117, 129 and 146 and the tuner control 102, volume control 118, on screen display control 127, descrambler control 110 and input key scanner and control 148 via commands through MCC 104 and control microprocessor bus (CMB) 131. The microprocessor 128 also directly controls the mute switch 125 and the output frequency selection of the modulator 142. The microprocessor 128 includes additional capacity for other auxiliary device communications and control through a data port 140.

The memory control 112 permits data coming from the three data decoders 117, 129 and 146 to be placed in a volatile memory such as DRAM 137. There it can be accessed by the control microprocessor 128 via the CMB 131. The MCC 104 also distributes control instructions from the control microprocessor 128 to the other parts of the MCC 104 to provide operation of the rest of the subscriber terminal 40. The MCC 104 additionally connects to a secure microprocessor bus (SMB) 143 which permits communications between the secure microprocessor 136 and other portions of the subscriber terminal 40. The SMB 143 is further coupled to the expansion card 138 to provide renewable security.

The memory control 112 and microprocessor interfaces of the MCC 104 are the central communications facility for the control microprocessor 128 and the secure microprocessor 136. The memory control 112 receives requests to write to memory or read from memory from the microprocessors 128, 136 and the other controls and data decoders. It resolves contentions for memory transfers, giving priority to real time applications and the microprocessors, and schedules the data flow. The microprocessors 128 and 136 communicate through internal registers of the MCC 104 with the memory control 112 and other portions of the MCC.

The expansion card 138 is a printed circuit card which contains memory and/or secure microprocessor components, which can be plugged into a connector 200. The connector 200 electrically extends the control microprocessor memory bus 141 and the secure microprocessor bus 143 to the expansion card 138. Additional program or data memory, or renewed security can be provided by the expansion card 138.

The subscriber terminal may optionally include an impulse pay-per-view (IPPV) module of either the telephone type 152 or the RF-IPPV type 154. The IPPV module allows the subscribers to request authorization of their subscriber terminal 40 to receive pay-per-view events, store the data associated with the purchase of the event in the non-volatile memory of the secure microprocessor 136, and then transmit the data to the system manager 12 via the telephone return path or the RF return path via the signal distribution system 52.

The on screen display system will now be more fully described beginning with reference to FIGS. 3–10. In FIG. 3, each on screen display can be generated as an array of pixels having up to 320 vertical columns and 200 horizontal rows. The 200×320 pixel size is chosen to generate adequate resolution for a standard NTSC receiver. Of course, other video formats, such as the several PAL formats, can be supported by adding additional pixels and lines. Additionally, different sized pixels forming other display areas can be provided for any television signal format. Each on-screen display is generated by the display controller 127 by producing analog pixels for the horizontal scan lines of the screen of the television receiver of the subscriber. The display controller 127, under the command of the control processor 128, controls the time of such display and which display to produce on the screen of a receiver.

The on screen display processor 127 operates on a video field by video field basis. A display screen is formed from display attributes and stored display data describing the screen or field in terms of pixels. This field can then be displayed in a noninterlaced form for nonvideo purposes or mixed in an interlaced form with active video. The field can be displayed many times to produce a static display, or the display parameters and display data can be changed to produce varying images. In either case, the on-screen display is activated by a command from the control processor 128 and will continue to display a screen which is stored in the display memory until disabled by the control processor. This produces a particularly advantageous system when the control processor 128 and display processor 127 can operate in parallel without completely monopolizing control processor resources.

In this display environment, three types of display modes can be produced including a text or symbol screen mode, a graphics screen mode, and a combination mode where text and graphics screens can be displayed together. In addition, any of these modes can be used in combination with a border screen mode.

In the text or symbol screen mode, as seen in FIG. 3, the on-screen display is defined as a plurality of symbols, each symbol being of a variable pixel array of size m×n, where m=6,7 . . . 16; n=6,7 . . . 32 and m×n≦512. By providing a variable size of symbol, many different types of symbol sets and sizes, such as different character fonts can be realized. Additionally, different foreign language character sets such as Japanese, Arabic, Chinese or others can be easily realized in this manner. A text screen can encompass the entire display array or be any size down to one symbol. Each text screen is defined by a vertical start and stopping point VSTART, VSTOP, and a horizontal starting and stopping point HSTART, HSTOP.

A preferred example for an English character set would be an 8×12 pixel array which would yield a maximum of 16 symbol lines on a text screen display with 40 characters per line. Another preferred example for a Chinese character set would be a 12×12 pixel array which would yield a maximum of 11 symbol lines on a text screen display with 26 characters per line. A plurality of these symbol arrays, each defining a particular character in a character set, are grouped in the display memory to form symbol set definitions, such as English, Chinese, font A, font B, etc. It is evident that the subscriber terminal 40 may store multiple symbol set definitions.

Figure 9:
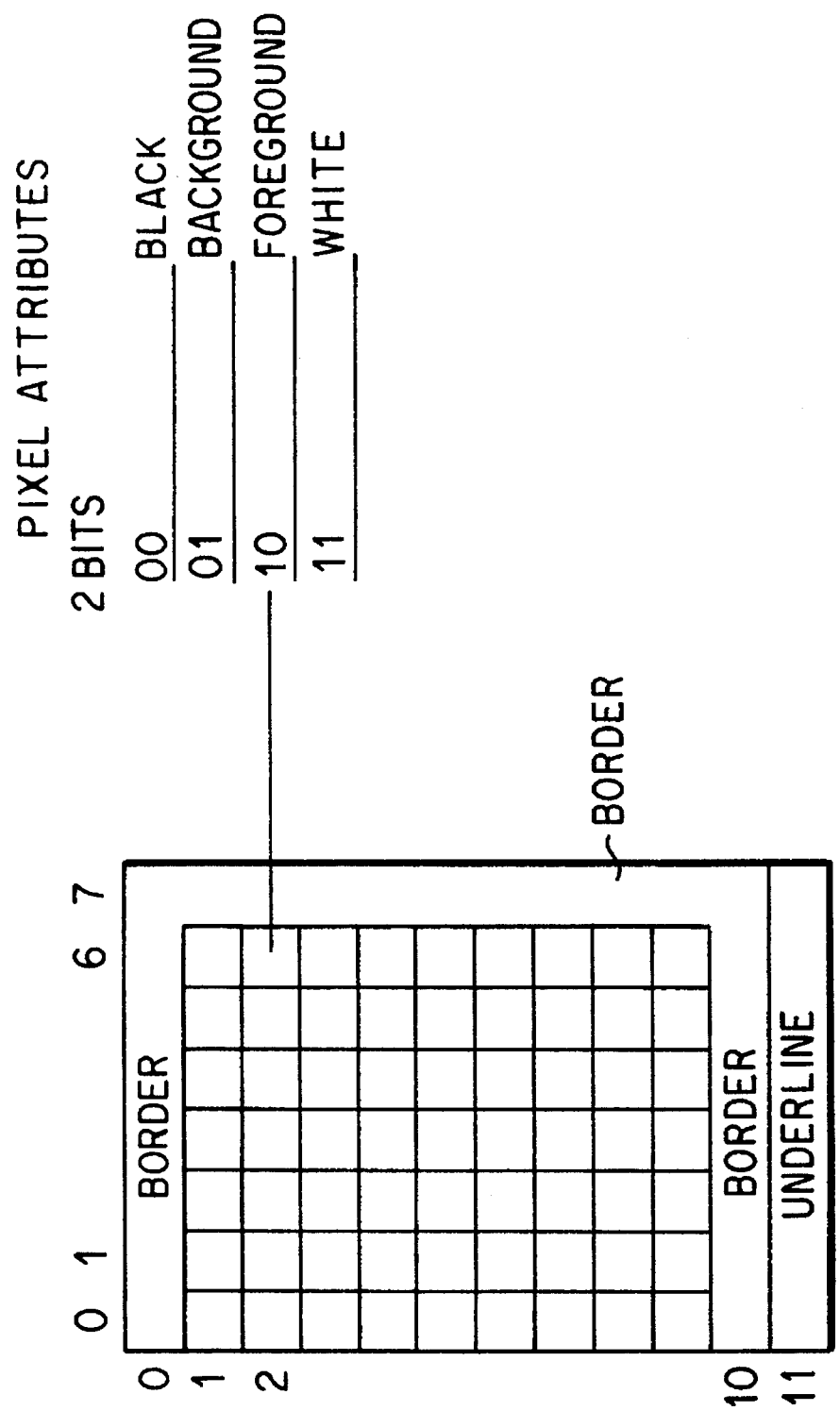
FIG. 9 is a pictorial representation of a generic symbol of the symbol set definition area of the display memory.

An example of a character from an English character set, a 8×12 pixel array, is illustrated in FIG. 9. The character has a 1×8 pixel underline and a 1 pixel wide border around a 7×9 pixel character field. The character is defined by selecting pixels from the character field in a particular pattern. Each pixel of a symbol definition is stored as a 2 bit pixel attribute field which describes one of the four possibilities shown in the table of the figure. Each pixel can be either a foreground pixel, a background pixel, a black pixel or a white pixel.

To build a text screen display, a plurality of symbol pointers (each addressing a selected symbol in a symbol set definition) is stored in the sequence which the characters are to be displayed. For example, if the word LIST is to be displayed on the screen, then successively, the symbol pointers for the English character set elements L, I, S, T would be concatenated. The pointers may further contain symbol attributes for each character as in shown in the example for FIG. 8.

The illustration shows a symbol pointer as a 16 bit word which has a 7 bit symbol attribute field and a 9 bit symbol address. The 7 bit attribute field contains a 4 bit field defining the color of a character. These four bits may select one of sixteen colors of a color pallet register stored for that purpose. The other three symbol attribute bits include one bit to determine whether the character is to blink, another bit to determine whether the character should be underlined, and a foreground mode bit for special effects for the character.

In the graphics screen mode, the display system utilizes the entire 300×200 pixel display as a pixel mapped graphic as seen in FIG. 4. Each pixel can be displayed as one of the sixteen colors of the foreground or background color pallet memory. In the graphics mode, the color is then selected by 4-bits stored for each pixel.

For the combination mode as seen in FIG. 5, both the symbol screen mode and the graphics screen modes are used simultaneously. A graphics screen of less than the full screen is defined and displayed in the normal graphics mode. This display can then be overlapped with a text mode display which does not display in the graphics window area. The reverse is also provided where a text screen can be overlayed on a graphics screen.

The display processor also includes a border screen feature where a border screen of a particular color may be placed around the graphics or symbol screens. The border feature is shown in exemplary form in FIG. 6 where the border pixels are active whenever the graphics screen and symbol screen are inactive and the border screen is enabled.

The color of the border screen is produced by loading a 12 bit color value in a border screen parameters register. The location of the border is set by loading the horizontal starting and ending locations, and the vertical starting and ending locations on the screen. The border screen may be disabled by storing a vertical start number which is larger than the maximum number of lines on a screen.

The display controller receives a number of display parameters which it loads into its control registers to regulate processing of the display function. The first set of display parameters is the screens heights and widths which can be at a maximum the full screen of a 320×200 pixel array and, if less than the full display area, the display screens locations. All those screens which will be active in the display area will have these parameters stored for them. The second set of parameters is a symbol set dimension nxm defining one of the symbol definition sets. As will be more fully discussed, multiple symbol definition sets can be stored and displayed in one screen.

The display system provides an extremely powerful and flexible tool for producing on screen displays for the subscriber terminal. The display system can be used in a text only or a full pixel mapped graphics mode only. The display can be a combination of text with a variably sized and variably positioned graphics window which itself is fully pixel mapped. The screens may be full sized or any smaller defined size for.

For a character or graphics display, thirty-two colors can be programmed for a character or pixels. The color palette registers may be changed to display 16 choices for foreground and 16 choices for background from a 4096 choice color palette. On a per line basis a character set can be changed. On a per character basis selections for background and foreground color are available. Moreover, characters may take on border, underline, blink and highlight features on a selectable basis.

The display system provides a color palette of approximately 4096 colors which are defined as 12-bit digital words having a 4-bit luminance component, a 4-bit B-Y (blue-luminance) chrominance component, and a 4-bit R-Y (red-luminance) chrominance component. Combinations of these bits allow a user to select a wide variety of colors. Of course not all 4096 combinations of 12 bits will define useful colors, but there are a great number of useful hues and tints available.

Figure 10:
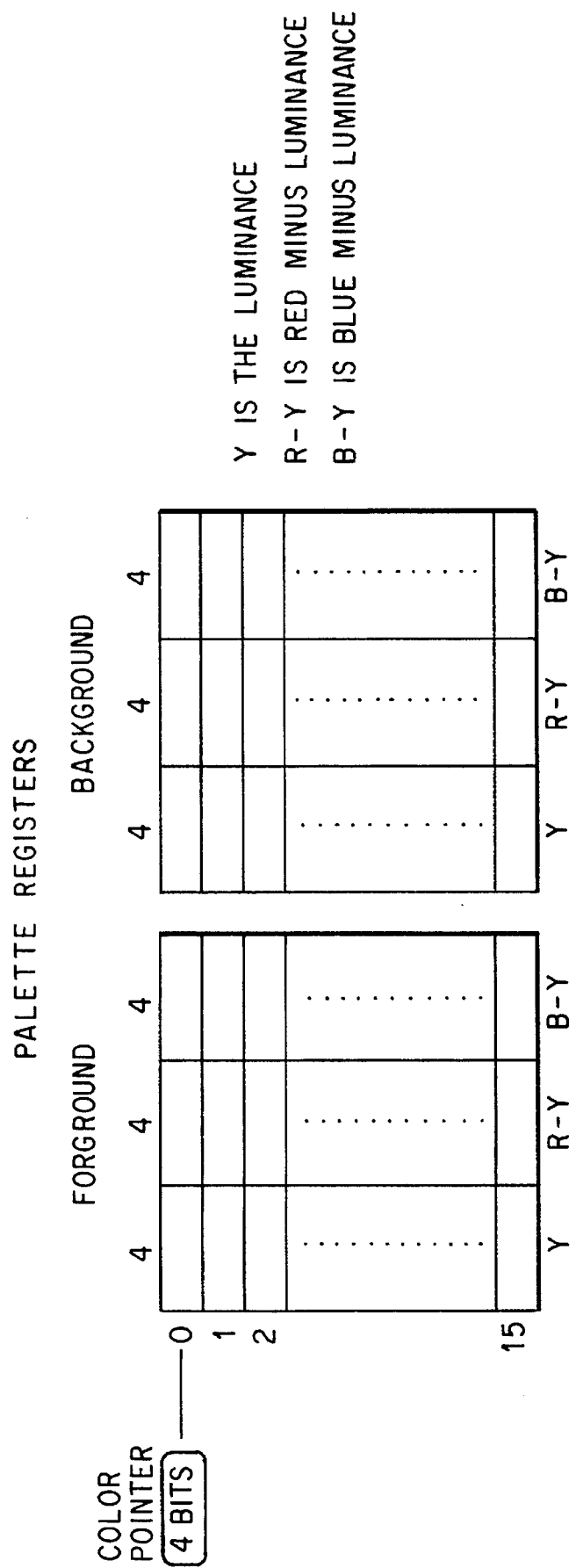
FIG. 10 is a pictorial representation of the palette registers used in the color selection for symbol.

The digital processor contains a plurality of palette registers as shown in FIG. 10 into which these colors can be stored. Any thirty-two of the colors can be stored at one time, as there are sixteen background color registers and sixteen foreground color registers. The system uses a 4-bit pointer to select one out of the sixteen colors for both foreground and background by pairing the registers. This feature is useful in providing a plurality of letters of one chosen color on a chosen background color, for example blue letters on a white background. This configuration can be programmed easily by the same color pointer for all letters indicating a palette register pair having a blue color loaded into the foreground register and a white color loaded into the background register.

Figure 11:
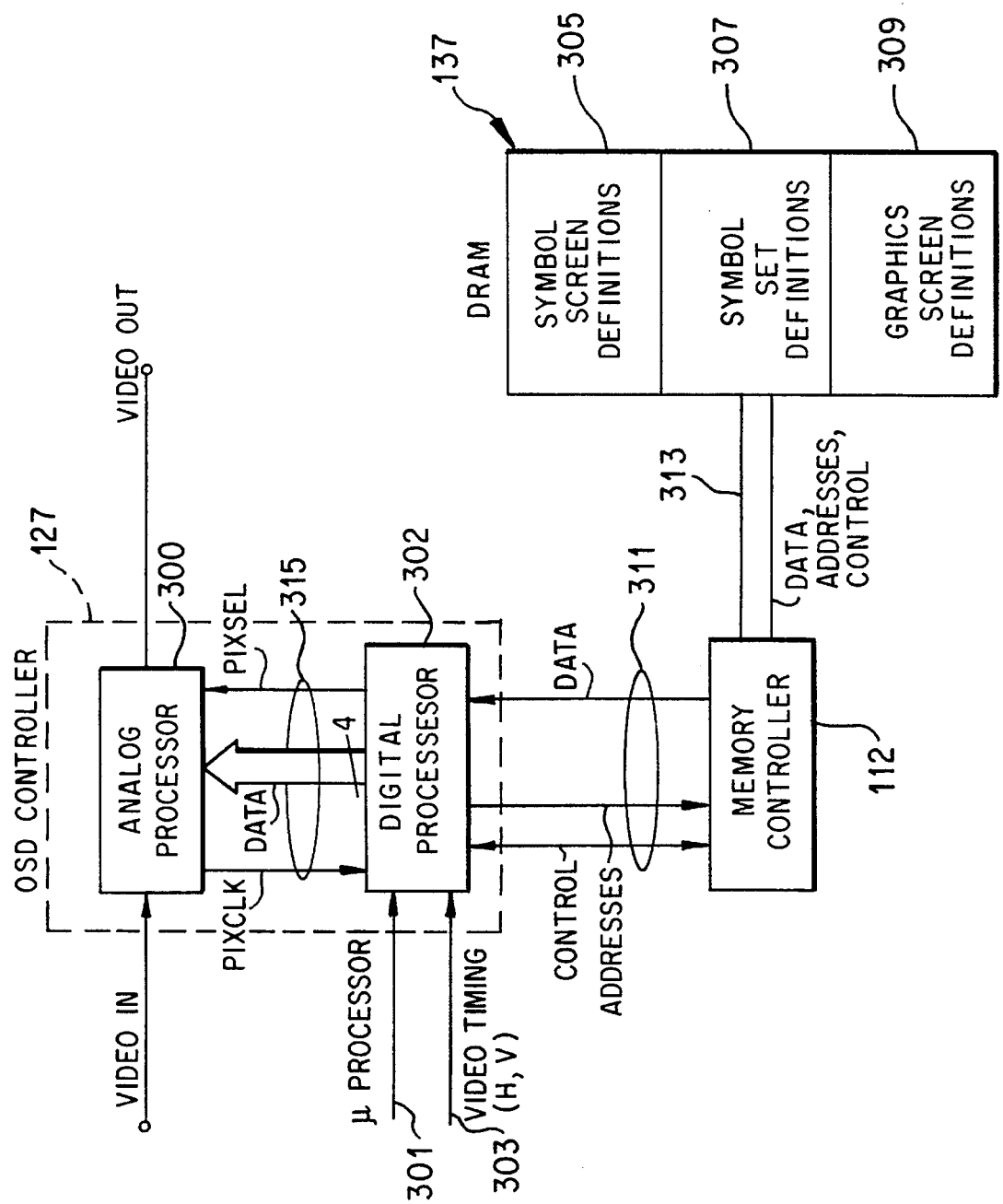
FIG. 11 is a functional block diagram of the display controller illustrated in FIG. 2 and a pictorial representation of the display memory partitioned into a symbol screen definitions section, a symbol set definitions section, and a graphics screen definitions section.

A system block diagram of the on screen display controller 127 is more fully illustrated in FIG. 11. The on screen display controller 127 operates under commands from the control microprocessor 128 to provide on-screen displays for the subscriber terminal in the form of text screens, graphics screens, or combinations of text and graphics screens. The on screen display controller 127 comprises a two part display processor including an analog processor 300 and a digital processor 302.

The digital processor 302 receives commands and configuration data from the control microprocessor 128 over a bus 301 and video timing data 303 from the VBI decoder 129 indicating the start of each horizontal line and the start of each vertical field. The digital processor 302 uses the display parameters from the control microprocessor 128 to access display information in the DRAM 137 for the particular on screen display which is to be generated. The on screen display may be only text, and, in that instance, the symbol screen definition portion 305 and symbol set definitions 307 portion of the DRAM 137 are accessed. If the on screen display is only graphics, then the graphics screen definitions portion 309 of the DRAM 137 is accessed. If a combined screen of text and graphics is needed, then all three portions 305, 307, and 309 of the display memory are accessed.

The digital processor 302 accesses information in these portions of display memory on a nybble by nybble basis. It fetches data from the DRAM by its connections to the memory controller 112 through control lines, address lines and data lines 311. The digital processor 302 requests data from the DRAM 137 by providing a calculated starting address, number of memory locations accessed, and control commands to the memory control 112, and the data is returned over the data lines 311 and 313. The digital processor 302 processes this data to convert it into a series of digital words, each indicating the luminance and chrominance values of a pixel for the on screen display. These digital words which represent analog pixels, along with appropriate timing signals, are sent from the digital processor 302 to the analog processor 300 over timing and data lines 315.

Figure 12:
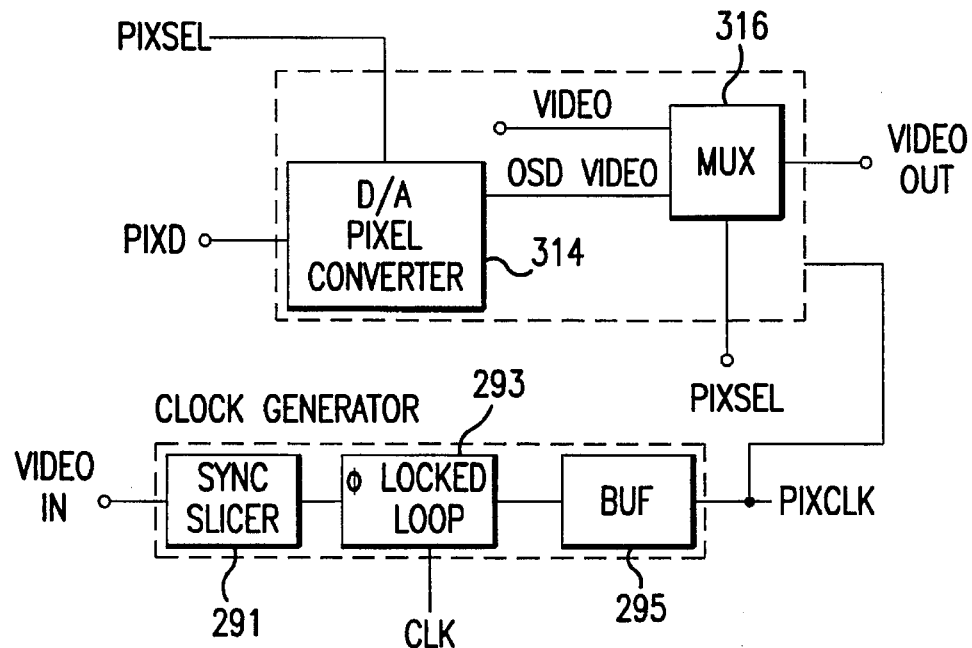
FIG. 12 is a detailed block diagram of the analog processor illustrated in FIG. 11.

As better illustrated in FIG. 12, the analog processor 300 includes a conversion means 314 to convert the digital pixel words to analog pixels. The analog processor 300 also receives the incoming video signal VIDEO IN, after its demodulation, and inputs the signal to one part of an analog multiplexer 316 which can select on a pixel by pixel basis, either analog pixels from the VIDEO IN signals or analog pixels from the digital to analog pixel converter of the analog processor 300. The analog processor 300 selects which pixel to output based on a pixel select signal PIXSEL. The digital processor 302 generates the pixel select signal PIXSEL based upon whether the display processor is enabled and is outputting a valid color definition.

The digital processor 302 causes the pixel select signal PIXSEL to choose the VIDEO IN signal if both of these conditions are not met. The multiplexed output is then output to the modulator 142 as the VIDEO OUT signal. The analog processor 300 further generates the pixel clock signal PIXCLX from a oscillator clock CLK. This is the basic training signal of the display processor and divides a horizontal line with 455 pixels of a duration of approximately 139 nanoseconds each. If the pixel clock is needed for display during a time when no VIDEO IN signal is tuned by the subscriber terminal, then it is generated directly from the oscillator clock signal CLK. This is a so called internal video mode. If the pixel clock is used for a display where the video signal is present, then it is generated by phase synchronization with the horizontal sync of the VIDEO IN signal by a sync slicer 291 and a phase locked loop 293.

Figure 14:
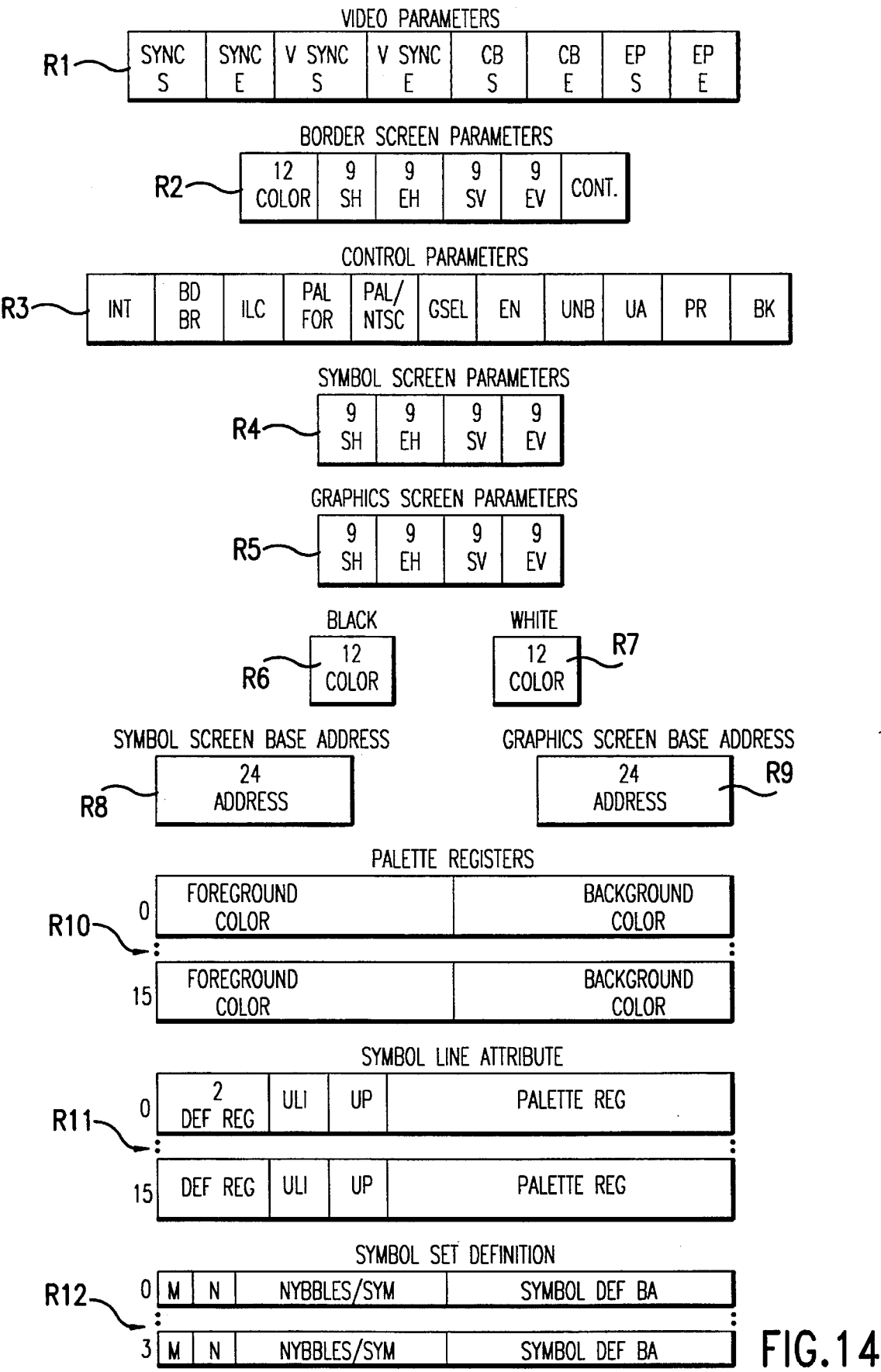
FIG. 14 is a pictorial representation of the mapping of the configuration registers for the digital processor illustrated in FIG. 13.

The digital processor 302 is controlled by the control processor 128 by reading and writing the registers R1–R12 shown in FIG. 14. The display attributes for the on-screen display can be controlled by loading and reading particular registers in the digital processor 302.

The type of screens which can be displayed and their location on the display area of the television receiver are provided by a border screen parameters register R2, a symbol screen parameters register R4, and a graphics screen parameters register R5. All of the screen registers have information concerning the horizontal starting point (SH) and stopping point (EH) and the vertical starting point (SV) and stopping point (EV) of each of the respective screens.

A symbols screen or graphics screen can also have associated with it the starting memory locations of where the display information is stored in DRAM 137. This information is loaded into the symbols screen base address register R8 for the symbol screen, and the graphics screen base address register R9 for the graphics screen. Because the border screen is generated internally and not stored in the DRAM 137, register R2 also contains a 12 bit digital word describing the color of the border screen. All pixels of the border screen are generated from this color.

To activate the symbol screen, the graphic screen or the border screen, the starting address of the screen must be within the display area limits. Conversely, to deactivate any of the screens, the vertical starting address of a respective screen is set to a line number outside the display area. A control bit CONTR is used in register R2 to enable and disable the function of the screen border.

The colors for a selected pixel of a screen can be chosen by one of the color registers R6, R7 and R10. There are sixteen foreground palette registers and sixteen background palette registers R10, a black color register R6, and a white color register R7. Each of these registers is capable of storing a 12 bit color as described for the palette section, 4 bits of luminance and 4 bits each of the two phases of chrominance.

There are two sets of registers R11 and R12 which provide control of the symbol line attributes. Each symbol line in a symbol screen display can be of a different font or style which is defined as a symbol set definition in the display system. There are up to sixteen symbol lines, and each of these can have a number of line attributes which are stored in sixteen symbol line attribute registers R11. The first field of a symbol line attribute register is the address of one out of four symbol set definition registers R12. The second field is a one bit line attribute, which selects either the foreground or background color for the underline color. The particular color palette register chosen is then described in a 4-bit field, palette register. Additionally, a special effects bit ULI for inverting the luminance for the underline is provided where, if the bit is cleared, the luminance of the underline is provided normally, and if the bit is set, the intensity of the luminance of the underline is inverted.

The two bit symbol line definition in the line attribute register R11 selects one out of four symbol set definition registers R12. Each symbol set definition register R12 stores the size of a particular symbol set, m ×n, the number of nybbles in a symbol, and the symbol definition base address.

Registers R12, along with the symbol line attribute registers R11, allow up to four different types of symbol set definitions to be used simultaneously in the display system.

The last two registers that are provided are for control and selection of different functions of the display processor. The first is a video parameters register R1 and the other is a control parameters register R3. The video parameters register R1 defines the control timing of the particular video signal that is to be generated by the display processor. The horizontal sync start time SYNC S and end time SYNC E are stored along with the vertical synchronization start time VSYNC S and end time VSYNC E. Also defined are the color burst start time CB S and end time CB E. To time the vertical blanking interval, the equalizing pulse start time EP S and end time EP E are also stored in the video parameters register R1.

The control parameters register R3 is a two byte register which stores a number of control bits choosing the modes and features for the display processor. The blink rate BR for symbols and underlines is stored in increments of 0.25 seconds from 0–4 seconds. The blink duty cycle BD can be set with two bits indicating duty cycles of 25%, 50% or 75% on and conversely 75%, 50% or 25% off. The blank screen bit BK can be used to blank a screen, if set to 1, or to display the screen normally, if set to 0. Further, an internal/external selection bit INT is used to determine whether the video signal is to be internally generated, if set to 1, or synchronized to the external video signal, if set to 0.

If the signal is being internally generated and is not being synchronized to an interlaced video signal, then an interlace control bit ILC can be set for non-interlaced fields or cleared for interlaced fields. Two further fields, P.ALFOR and PAL/NTSC, are used to select either the NTSC or PAL format and, if PAL format, the type of PAL format which is to be selected. The bit GSEL is used to select whether the color palette for graphics is the foreground palette or the background palette. The control bit EN is used to enable the on screen display controller or disable the on screen display controller. The underline blinking bit UNB indicates whether the underline of a symbol will blink or not blink. Four bits for an upper address field UA are used to allow the digital processor 300 to extend the size of DRAM 137 which it can normally address. The control bit PR is used to indicate whether a symbol screen has priority over a graphic screen, or if the graphic screen has priority over the symbol screen.

To display a screen, a screen display routine from the executable code is called for execution by the control processor 128. The screen display routine will move the particular screen information which it is programmed to display from the nonvolatile memory (ROM or flash EPROM) to the display memory area of DRAM 137. The screen display program can then disable the digital processor 300 by clearing the enable bit EN to load the processor registers R1–R12 with the desired display attributes. Normally, the screen display routine will only disable the display of the digital processor 1302 by setting the blank bit BK if it needs to only reload the palette registers or line attribute registers.

The control processor 128 need not load all the processor registers because it can read them to determine if any changes are actually needed. For example, once the video parameters register R1 and most of the control registers R3 have been programmed once, they will not often need to be changed. Likewise, the color registers R6, R7 and R10, after they have been set up with the desired palette of colors, will remain relatively unchanged for many display scenarios. Moreover, because four different symbol set definitions or fonts can be used simultaneously, the line attribute and symbol set definition registers R11 need not be changed for every scene change.

The most likely registers to be changed are the registers R8 and R9 to indicate to the digital processor 300 where the screens are to found in the DRAM 137. The next most likely registers to be changed are the screen parameter registers R2, R4 and R5 which position the different screens on the display area.

After the control processor 128 has set the display attributes in the registers R1–R12 to the desired display configuration, it will re-enable the digital processor 300 by setting the enable bit EN or clearing the blank bit BL to display the stored screens until the device is thereafter again disabled, or the display information or the configuration information is changed.

Figure 13:
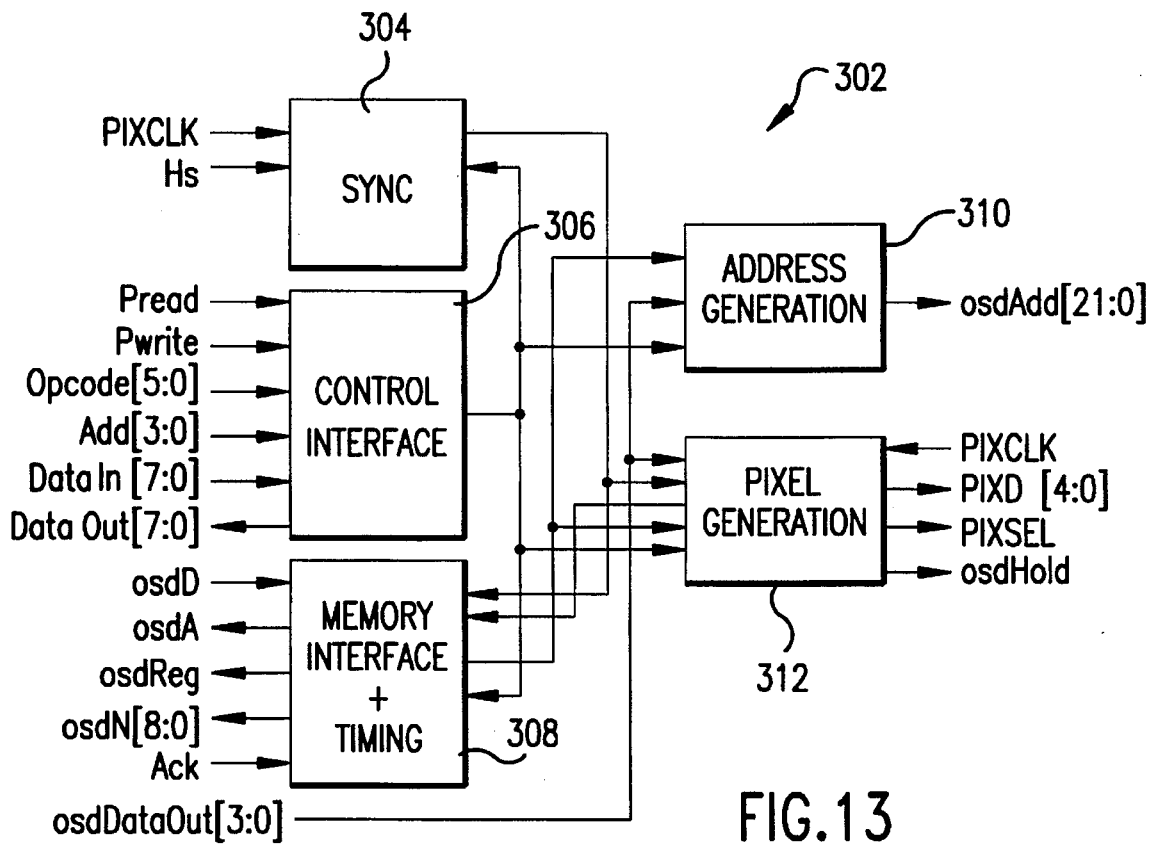
FIG. 13 is a detailed block diagram of the digital processor illustrated in FIG. 11.

A more detailed block diagram of the digital processor 302 is shown in FIG. 13. The digital processor 302, under the command of the control processor 128, generates the digital pixels for an on screen display from information stored in the DRAM 137. The on screen display can be programmed with a number of attributes which will change its appearance by programming the digital processor 302 with the commands from the control processor 128. In general, the digital processor includes a synchronizing circuit 304, a control interface circuit 306, a memory interface and timing circuit 308, an address generation circuit 310, and a pixel generation circuit 312.

The synchronizing circuit 304 has two modes of operation, internal and external. When in external mode, the circuit 304 receives a timing signal Hs from the VBI decoder 129 and uses it to synchronize the operation of the display processor to the VIDEO IN signal. The Hs signal is also passed to the pixel generation circuit 312 and other circuits to provide basic timing information. The Hs signal is synthesized by the VBI decoder circuit 129 from the incoming video signal to provide a one clock pulse wide (24 Mhz) signal at the initiation of every horizontal line, and a clock pulse of two clock pulse widths at the beginning of field one, at line one, of a television signal. From the Hs signal, the pixel clock signal PIXCLK, and data from the control interface circuit 306, the synchronizing circuit 304 provides the pixel number of a particular horizontal line and the horizontal line number of the present video field.

These timing signals are provided to the other circuits of the display controller to produce pixel time base. The timing signal Hs resets the pixel line number, and the extended timing signal Hs resets the horizontal line number to a predetermined starting line. When operating in internal mode, the synchronizing circuit 304 generates the timing signals from the pixel clock signal, PIXCLK without synchronization to an external video signal. In addition, whatever the mode, timing pulses are generated indicating the positions of the horizontal sync time, sync tip time, the color burst time and equalizing pulse time to permit the pixel generation circuit 312 to insert the appropriate signals in the video output.

The control interface circuit 306 provides a means for the control processor 128 to access the configuration registers R1–R12 of the digital processor 302. The circuit 306 decodes the operational commands, OpCode and addresses ADD of the control microprocessor 128 to determine which configuration register is to be read or written, and with what data. To provide the configuration data and to read the status of the digital processor 302, the control interface circuit 306 has an 8 bit data bus DataIN coupled to all of the configuration registers for the write operation,. and an 8 bit data bus DataOut coupled to the output of all of the configuration registers R1–R12 for the read operation. The outputs of the configuration registers R1–R12 are then used to provide control signals and configuration data to the other circuits.

The address generation circuit 310 and the memory interface and timing circuit 308 operate cooperatively to fetch display data from the DRAM 137 and supply it to the pixel generation circuit 312. In this regard, the address generation circuit 310 will calculate the beginning address of a block of data OsdADD. The memory interface circuit 308 registers the memory transfer with the osd REQ signal and will assert the signal osd A during active video times. The memory interface circuit 308 will also generate the number of bytes OsdN to be fetched from the DRAM 137. Each byte will be acknowledged when sent with an signal ACK from the memory controller 112 and the data delivered over a 4 bit bus osdDATAOUT directly to the pixel generation circuit 312.

When the memory controller 112 has finished its transfer, it will alert the memory interface 308 with a signal osdD. If the pixel generation circuit 312 is receiving more data than it can display, then it will request a suspension in the memory transfer cycle from the memory controller 112 by asserting the pause signal osdHOLD. The memory controller 112 will pause in response to the signal and not resume the transfer until the signal is osdHOLD disabled.

The pixel generation circuit 312 receives the timing data from the synchronizing circuit 304 and the display data from the DRAM 137 via the memory controller 112 and converts the data into digital pixels for the analog processor 300. The display data is properly displayed by modifying it by the various configuration data which has been stored from the control processor 128 in the plurality of configuration and control registers R1–R12.

The detailed schematic diagrams for the digital processor 302 are illustrated in FIGS. 15–20 and will now be more fully explained by reference thereto.

Figure 15:
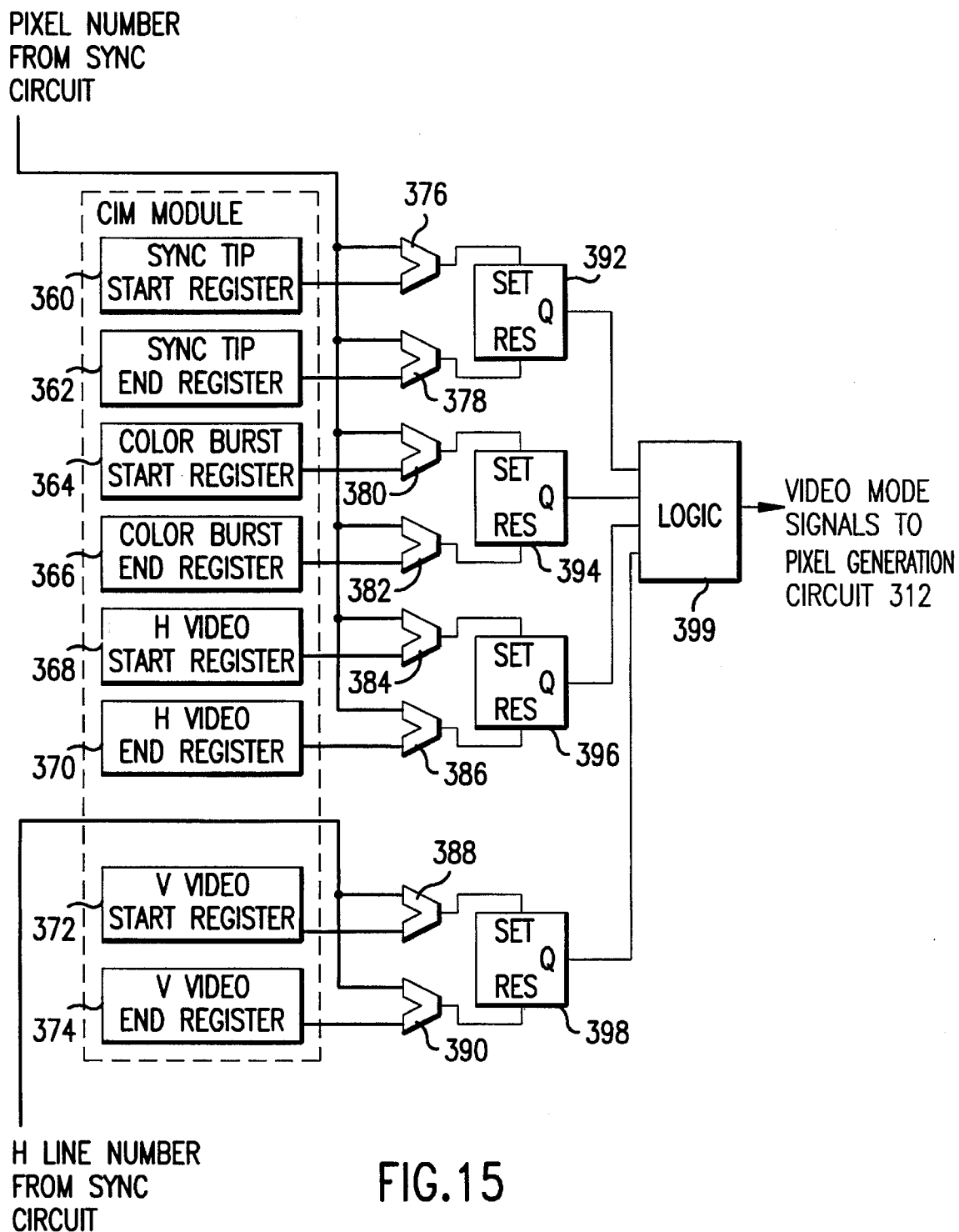
FIGS. 15–20 are detailed electrical schematic diagrams of the various parts of the digital processor illustrated in FIG. 13.
Figure 16:
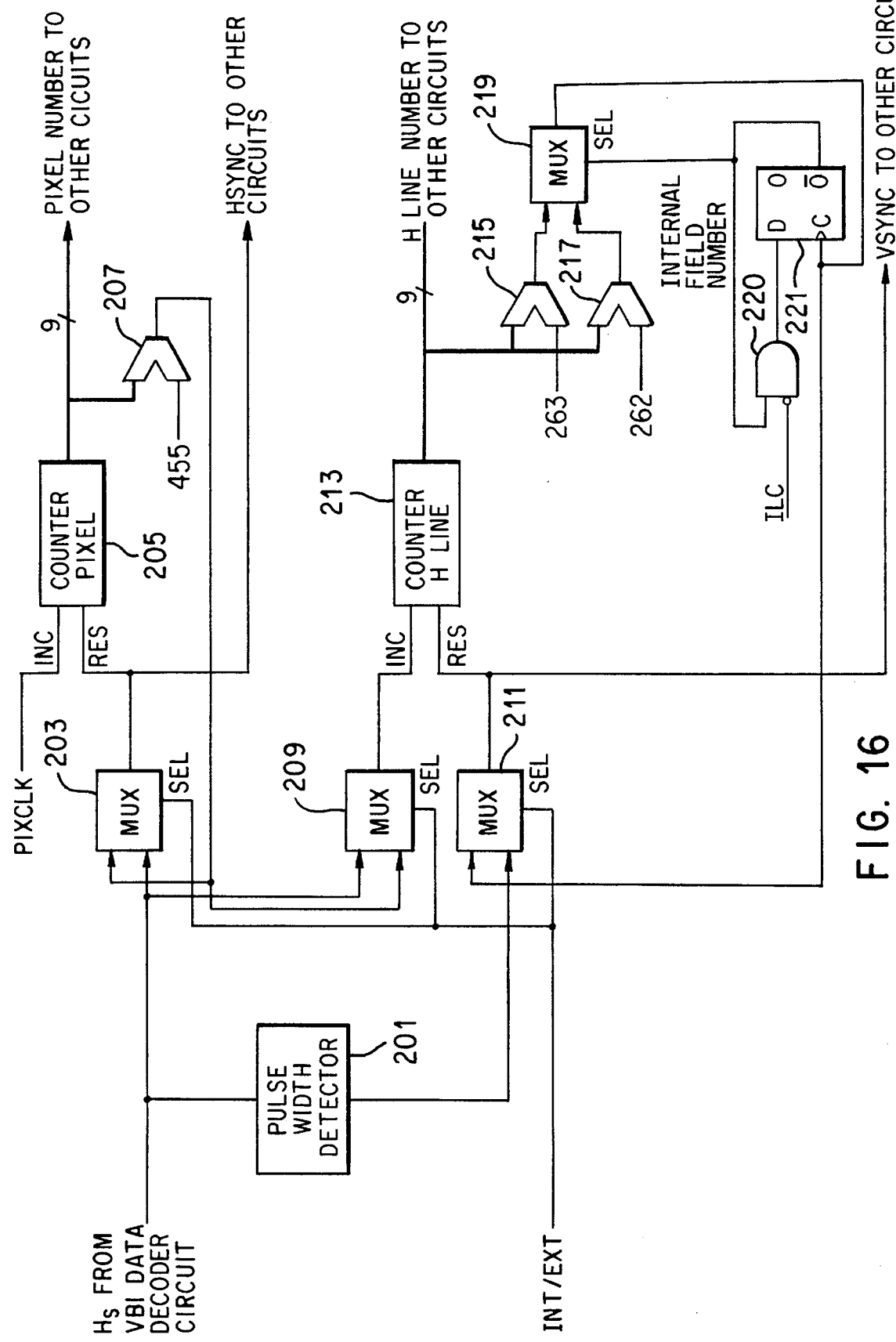

FIGS. 15 and 16 illustrate a detailed schematic circuit diagram of the synchronizing circuit 304. With respect to FIG. 16, in response to the pixel clock signal PIXCLK and the horizontal synchronizing signal Hs from the VBI data decoder circuit 129, the synchronizing circuit 304 generates the basic horizontal and vertical timing signals for the display system to the other processor circuits. The timing signals can be internal which are synchronized to a derived time base or external which are synchronized to the VIDEO IN signal.

The synchronizing circuit 304 comprises a pixel counter 205 and a horizontal line counter 213. The pixel counter 205 is incremented on the time base of the signal PIXCLK to count to 455, which is the number of pixels in each horizontal line. The comparator 207 senses the output of the counter 205 and compares it to 455. A reset signal RES is output from the comparator 207 when the pixel counter 205 reaches that number of pixels. This reset signal is used as one input to a multiplexer 203 to indicate the internal horizontal line duration.

The multiplexer 203 also receives another input from the horizontal synchronizing signal Hs to provide an indication of when the counter 205 should he reset at the beginning of an external horizontal line. Alternatively, if the time base of the circuit is to he generated internally the internal bit signal INT/EXT from the control register selects the output of the comparator 207 to reset the pixel counter 205. The output of the multiplexer 203 is further used to generate the horizontal sync signal HSYNC signal to the other circuits which, depending upon the internal hit signal, can either he the signal Hs or the output of the comparator 207. The internal signal INT/EXT is generated hy the setting or cleaning of the hit in the control register. In general, the external synchronization of a video signal is used hut, when no video signal is present, the internal bit is set by the control processor 128. The situations where no video signal will he present are on power up, menu display, some pay per view functions, changing channels, etc. The control processor will sense this status and set the internal bit to provide a time base for the display despite the lack of a video signal.

The vertical synchronizing signals are generated similarly. The horizontal line counter 213 basically counts the number of horizontal lines in a field and then is reset at the beginning of the next field. The multiplexer 209 outputs a signal which increments the counter 213 for each horizontal line. One of the inputs to the multiplexer is the external horizontal synchronizing signal Hs and the other input is the output of the comparator 207 from the internally generated horizontal line count. The time base selection signal INT/EXT then selects between these two inputs to increment the counter 213 for each horizontal line.

The reset signal for the counter 213 at the beginning of each field is provided by the output of a multiplexer 211. For an external reset of the counter 213, a pulse width detector 201 detects the two clocks wide pulse of the VBI data decoder circuit 129 which indicates that the timing of the external video signal is beginning field one, line one. The other input to the multiplexer 211 is an internally generated field number which is the output of multiplexer 219. The time base selection bit INT/EXT is used to select between these two reset signals.

The internally generated field numbers are provided by the outputs of the comparators 215 and 217 which have one input connected to the output of the counter 213, and their other inputs connected to a predetermined number of horizontal lines 263 and 262, respectively, for an NTSC signal. The output of the multiplexer 219 generates its own select signal via the output of a D bistable 221. The output clocks the bistable 221, which has its, *Q output coupled back to the D input of the device. The selection signal alternates between the inputs of the multiplexer 219 to select between the alternate fields of an internally generated video signal having fields of 263 lines, as detected by comparator 215, and 262 lines, as detected by the comparator 217. The D-bistable 221 is disabled from the alternate selection of the two fields by the NAND gate 220 which stops the feedback. In this mode only one field, field 1, is generated by the synchronizing circuit 304. The gate 220 is disabled and enabled by the control bit ILC which produces an interlaced (2 fields) display if in one state and a non-interlaced (1 field) display if in the other state.

The horizontal line number then is output from the counter 213 to the other circuits along with the vertical synchronizing signal VSYNC from the output of the multiplexer to 211.

FIG. 15 shows a detailed schematic of the portion of the synchronizing circuit 304 which generates the video mode signals to the pixel generation circuit 312. The video mode signals are to partition the video signal into three portions and to time the actual generation of pixels for the on screen display. The first portion is an active video portion which corresponds to a normal active video section of a horizontal line extending from the back porch of the horizontal blanking pulse to the front porch of the next horizontal blanking pulse. In the present embodiment, this active video is a predetermined number of pixels in length where each pixel is 139 nanoseconds. The video mode signals further provide a group of signals which define the horizontal and vertical blanking signals, the active video portions, and the retrace intervals. The decoding logic 399 generates the video mode signals to the pixel generation circuit 312 by decoding four video active signals from bistables 392, 394, 396 and 398.

The sync tip active signal is the output of the bistable 392, which is set by a comparison between data indicating the start of a sync tip from register 360, and the pixel number from the sync circuit 304. The sync tip active bistable 392 is reset by a comparison between the pixel number and the sync tip end register 362. The color burst active signal is generated as the output of a bistable 394. The color burst active bistable 394 is set by comparator 380 which compares the value of the color burst start four register 364 with the pixel number. The bistable 394 is reset by a comparison between the pixel number and the contents of the color burst end register 366.

The video line active signal is produced as the output of a bistable 396. The video line active bistable 396 is set by comparator 384 from a comparison between the contents of H video start register 368 and the pixel number. The bistable 396 is reset from the output of a comparator 386 which determines when the contents of the H video end register 370 matches the pixel number. The fourth active signal is the active field signal from the output of a bistable 398. The bistable 398 is set by comparison between the contents of the V video start register 372 and the horizontal line number from the sync circuit 304. The bistable 398 is reset from the output of comparator 390 which compares the horizontal line number with the contents of the V video end register 374. The active video signals define the timing of a field of an NTSC signal, or other video formats, into pixels and horizontal line numbers. By preloading the registers with suitable parameters, most timing formats and protocols for a video signal can be programmed into the display controller.

Figure 17A:
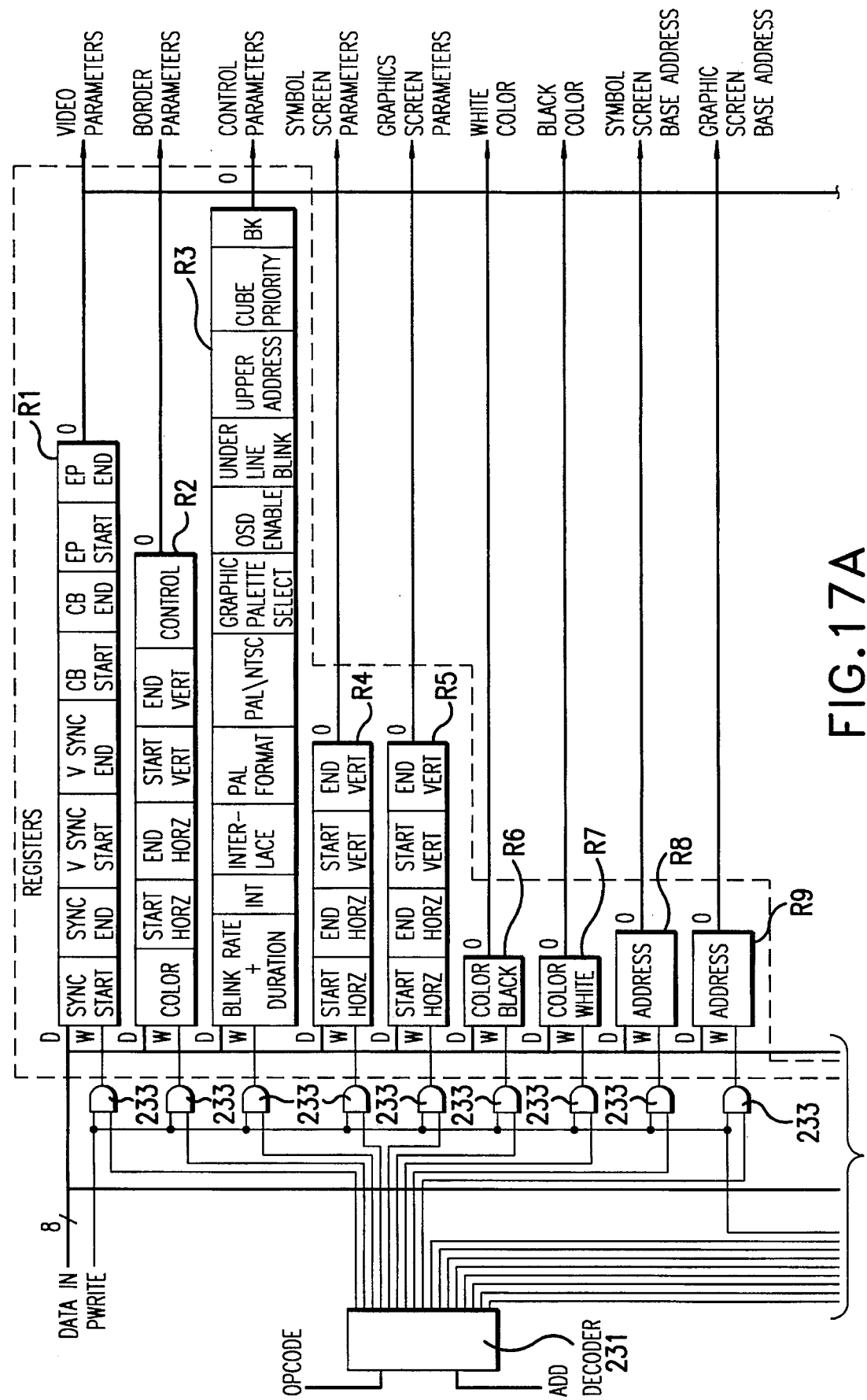
Figure 17B:
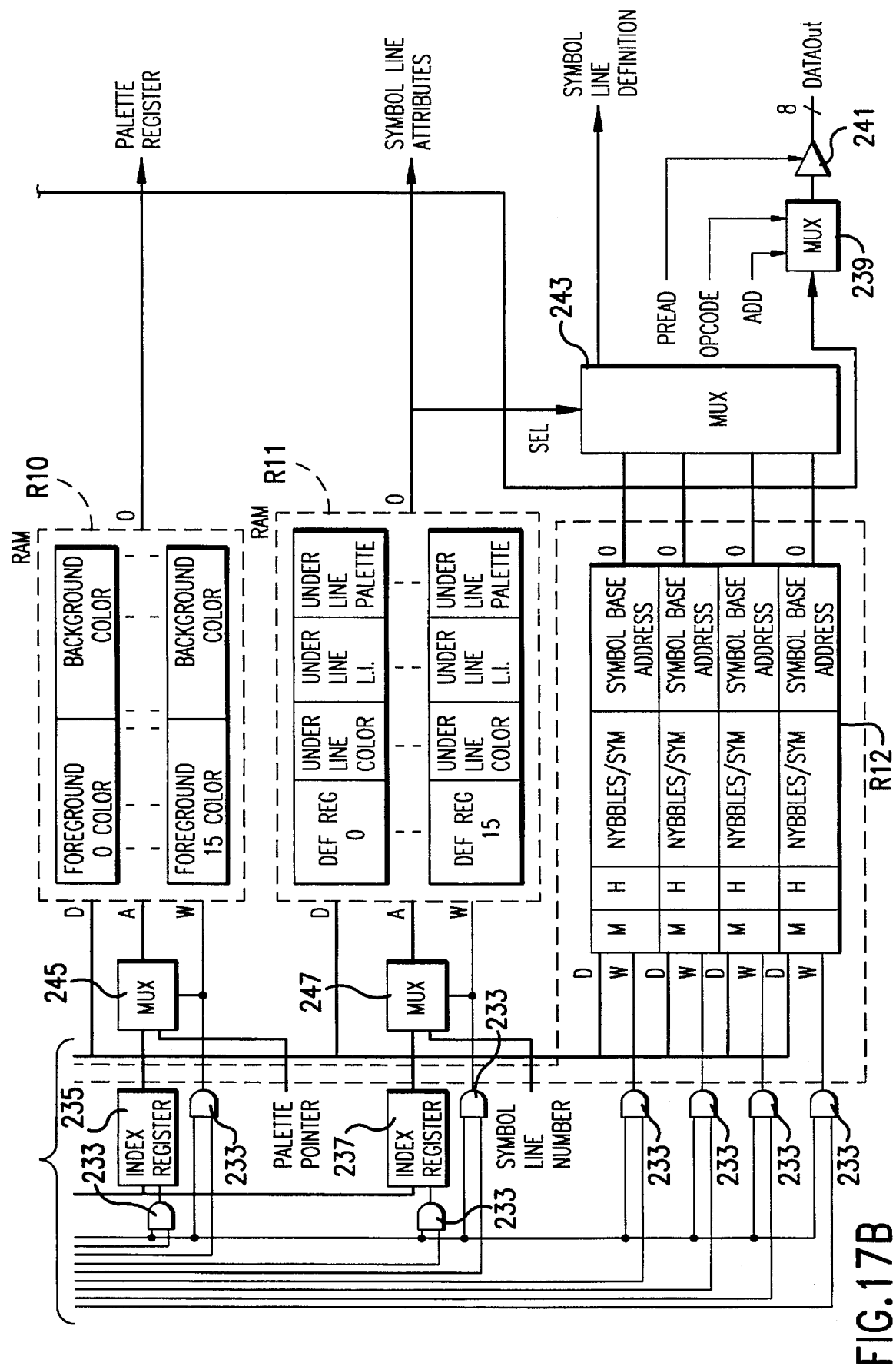

FIG. 17 illustrates a detailed schematic of the control interface circuit 306. The control interface circuit 306 provides the electrical and logical data path connections between the digital processor 300 and the control processor 128 so that the latter can control and configure the former. The control interface circuit 306 provides the control signals and data from the control registers R1–R12 to the other circuits of the digital processor. Input of the control and configuration data to be stored in the registers R1–R13 is via an 8-bit data bus, DataIn which is connected to the data inputs D of all the registers R1–R12.

The command signal, Opcode, and the address signal, ADD, from the control processor 128 indicate which byte of which of the registers R1–R12 is to be read or written. The write operations for the registers are decoded by a decoder 231 which selects the correct register and byte with a plurality of output control lines. Each of the output control lines are connected to the write inputs W of the registers R1–R12 through a plurality of AND gates 233. The other input to the AND gates 233 is the control processor write signal Pwrite.

The control processor 128 can write any of the positions in the registers R1–R12 by selecting the memory location where the data is stored, providing the data on the input bus, and then causing the write operation to occur by generating the signal Pwrite. In this manner, the control processor 128 can configure or change the registers in the digital processor 302 at any time. Once the digital processor 302 is configured, the control processor 128 can enable the device to generate the display and return to other control processing. This permits an extremely fast control of the digital processor 302 without requiring the control processor 128 to dedicate all of its resources to display processing.

The control processor 128, when it is desired to configure the digital processor 302, is not required to use the write process because the control processor can also read any of the outputs of the registers R1–R12. With a memory read operation, the control processor 128 can test to determine if the configuration is already that which is desired. The read process is produced by coupling all of the outputs of the registers R1–R12 to the inputs of a multiplexer 239. Any particular byte of a register which is to be read can be provided by decoding the command signal Opcode and address signal ADD at the selection inputs of the multiplexer 239. This will select one of the bytes of the registers R1–R12 for output on an output data bus, DataOut, through a group of a tri-state buffers 241. The tri-state buffers 241 are enabled by the control processor read signal Pread. The control processor 128 can read any output from the registers R1–R12 by selecting the byte and, when it is ready to read the data on the bus DataOut, by enabling the tri-state buffers 241 with the signal Pread.

The palette registers R10 and the line attribute registers R11, in addition to having data input lines and write enable lines, also include address lines A because they are groups of registers implemented in random access memory. The address of a particular register of the group is selected from the output of the multiplexer 245 for the palette registers R10. Normally, the address is selected by the color selection bits of a symbol pointer. However, if the control processor 128 wants to write a register of the palette registers R10, it must load the address of that register in an index register 235 which is the alternative input of the multiplexer 245. The Pwrite signal then will cause the multiplexer 245 to select the contents of the index register 235 as the address when writing information into the palette register R10 from the bus DataIn.

A similar method is used to write the line attribute registers R11 with the output of a multiplexer 247 connected to the address selection lines A of this memory. Normally, the symbol line number from the symbol line counter will be used to address the registers R11. However, if the registers R11 are to be written by the control processor 128, the address is selected by an index register 237 which can be loaded through the bus DataIn. One output of the line attribute registers R11 is the selection of the symbol definition from the symbol set definition registers R12. The definition of the symbol set is used for the selection inputs of a multiplexer 243 which chooses one out of the four symbol set definition registers R12.

The outputs of the registers R1–R12 are used by the other circuits to provide the parameters needed for the control of the display and the control signals needed to select different modes for the display processor. The total information concerning the display is stored in the registers R1–R12 and form a display configuration which is variable depending upon the display attributes stored in the particular registers.

Figure 18A:
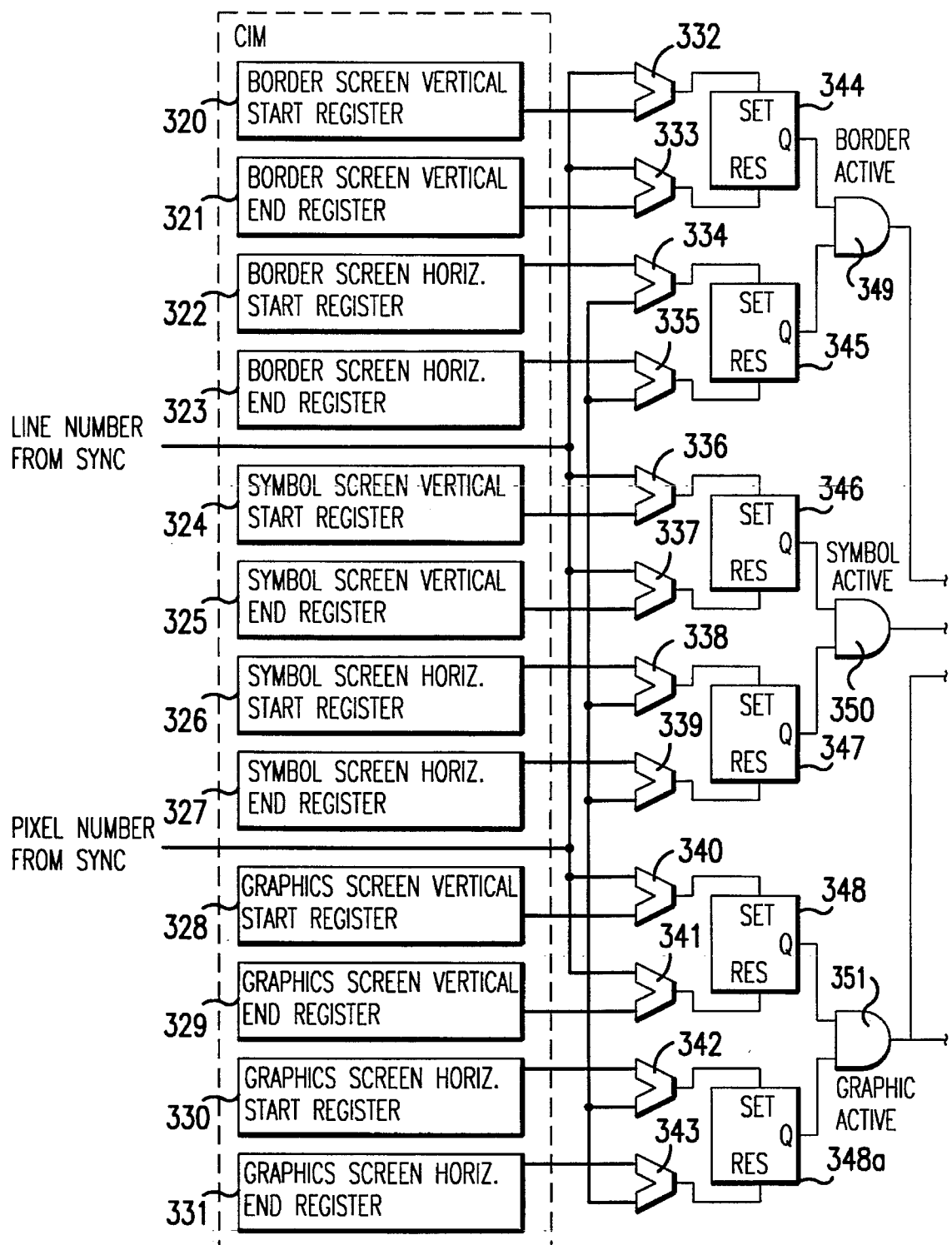
Figure 18B:
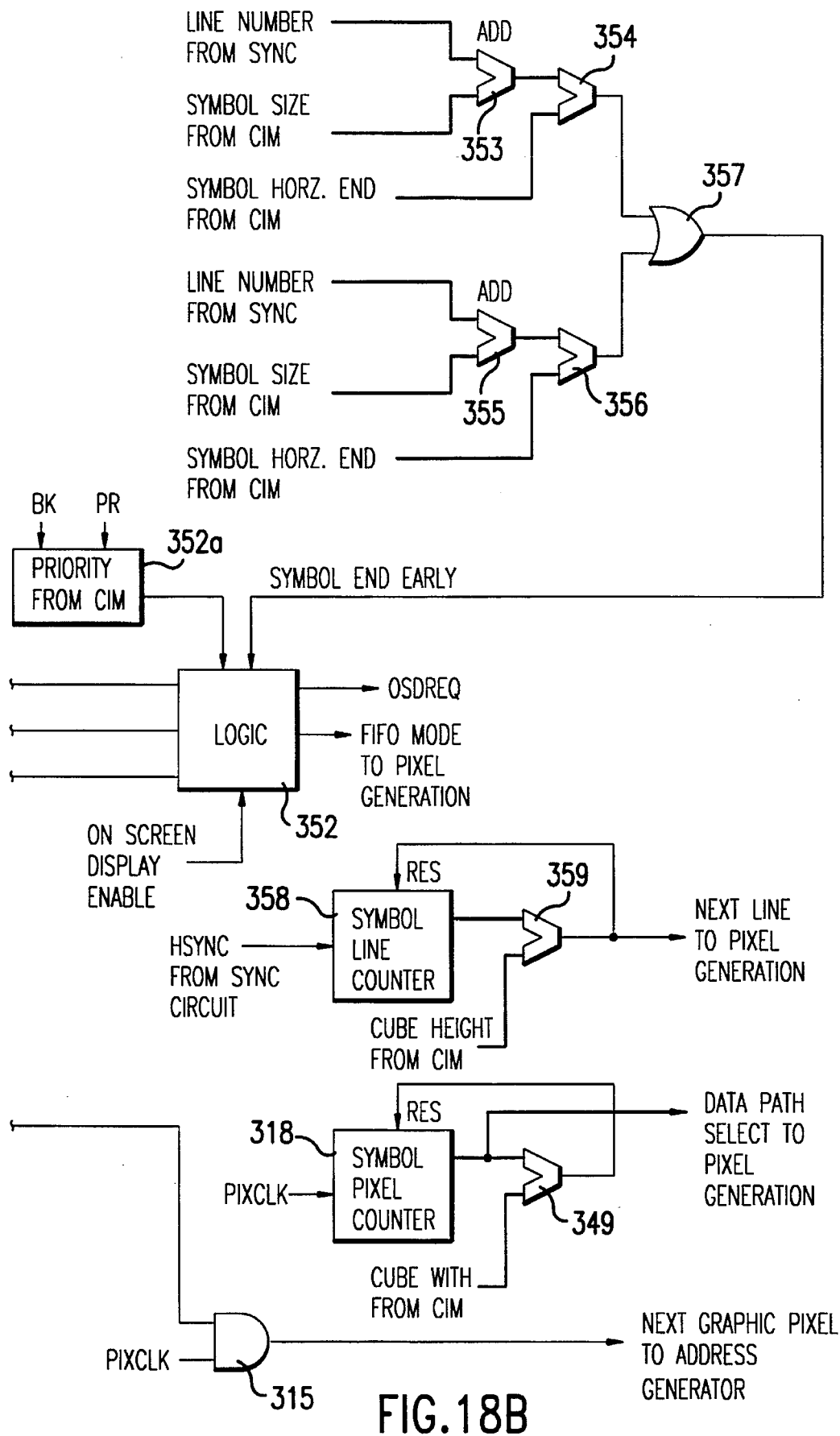

With regard to generating timing signals for determining when each type of screen is active, reference is given to FIG. 18. In the control interface circuit 306 there are 12 registers 320–331 which indicate the boundaries and locations for each of the three types of screens. Registers 320–323 store information concerning the vertical start and end, and the horizontal start and end, respectively for border screens. Registers 324–327 store information concerning the vertical start and vertical end, and horizontal start and end information for symbol screens. Registers 328–331 store information concerning the vertical start and end, and horizontal start and end information respectively for the graphic screens.

Logic including comparators 332, 333 and a bistable 344 determine from this information and the horizontal line number whether the border screen has stopped and started vertically. Bistable 344 outputs a high logic level from the beginning line number of a border screen to the end line number of a border screen. Likewise, bistable 345 decodes whether a border screen is active horizontally. The comparators 334 and 335 compare the contents of the registers 322 and 323 to the pixel number and output a high logic level from the bistable 345 if the pixel number is between the horizontal start and end of the border screen. A combination of the high levels from bistables 344 and 345 produce a border screen active signal from the output of an AND gate 349. In a similar manner, AND gate 350 develops a symbol screen active signal from the outputs of bistables 346 and 347. The bistable 346 is set to a high logic level between the vertical start and end of a symbol screen. The comparators 336 and 337 compare the contents of registers 324 and 325 to the horizontal line number to set and reset the bistable 346. The horizontal extent of the symbol screen, which is stored in registers 326 and 327, is with the assistance of comparators 338 and 339 used to set and reset the bistable 347. A high level output from the bistable 347 indicates that the pixel number is between the horizontal starting position and the ending position of the symbol screen.

In an identical manner, the AND gate 351 develops a graphic screen active signal from the outputs of bistables 348 and 348a. The bistable 348 is set at the vertical start of the graphic screen and is reset at the end of the graphic screen. The bistable 348a is set at the beginning of the horizontal start of the graphic screen and is reset at the horizontal end of the graphic screen. Comparators 340 and 341 set and reset the bistable 348 by a comparison between the horizontal line number and the contents of registers 328 and 329, respectively. The bistable 348a is set and reset by comparators 342 and 343 comparing the pixel number to the horizontal start and end contents of register 330 and 331, respectively.

These signals are combined in logic 352 with a priority signal from a priority control circuit 352a to indicate to the address generation circuit 310 from which portion of memory pixel data should be selected. The general rule is the symbol screen and the graphic screen both have priority over the border screen. Thereafter, the graphics screen or symbol screen will have priority depending on the configuration data stored in register R3 for the priority bit PR. This permits a symbol screen to be overlayed on a graphics screen or vice-versa.

Figure 7:
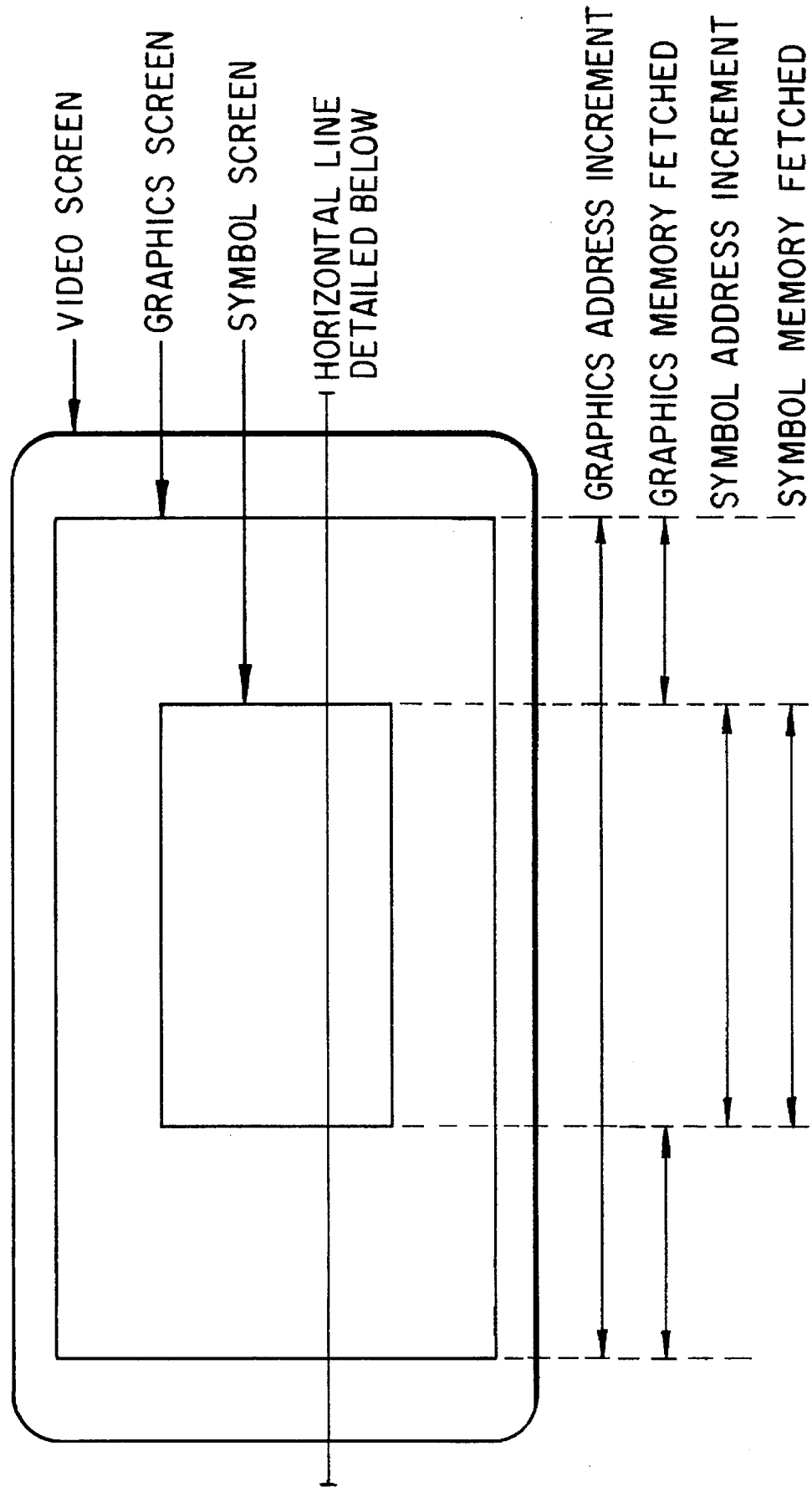
Figure 8:
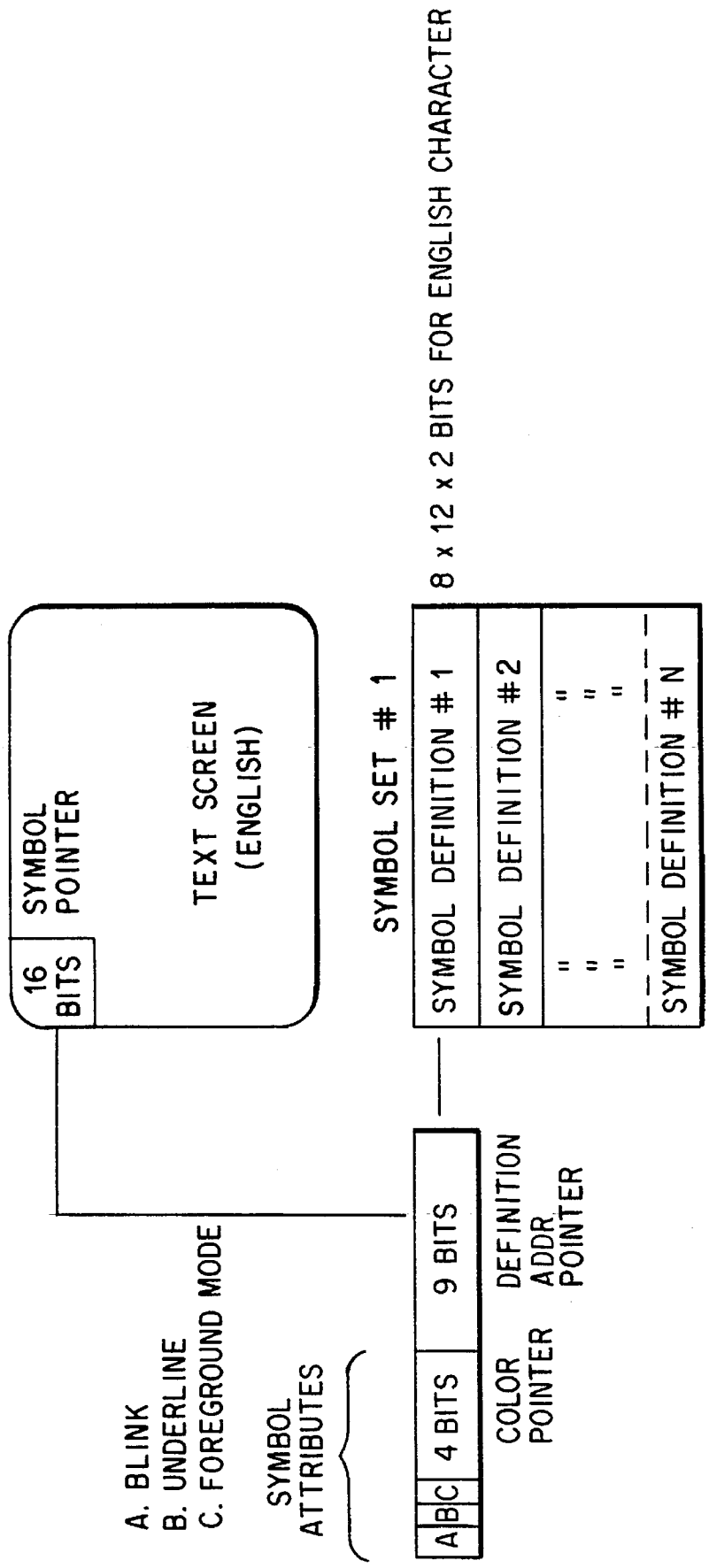
FIG. 8 is a pictorial representation of a pointer of the symbol screen definition section of the display memory.

FIG. 7 illustrates symbol screen which has priority. When pixels in the symbol screen are active, display data is fetched for it rather than the graphics screen. Another priority determination is made to check if the blanking bit BK is set in the control register. The blanking bit will take priority from both other screens and essentially blank the screen by displaying the border screen. This will allow a smooth transition between channels and other states where a symbol screen, a graphics screen, or active video is inappropriate. In addition to this priority determination, if the symbol end early signal is generated to logic 352, the display processor will fill in end spaces with the border pixels of the color selected. This also occurs for the border screen pixels, if there is a gap between a symbol screen and a graphics screen.

The symbol end early signal is generated from an OR gate 357 which has inputs from comparators 354 and 356. Adders 353 and 355 provide one input for the comparators 354 and 356 and the other is the line number and the symbol size. The other input into the comparators is the horizontal end signal for the symbol.

The timing circuit 308 further produces a next line signal to the pixel generation circuit 312 as the output of a comparator 359. The comparator 359 compares the contents of a symbol line counter 358 with the cube height (n). The symbol line counter 358 counts the lines of a symbol by its incrementation from the horizontal sync signal HSYNC from the syncronization circuit 304. When the symbol line counter is equivalent to the cube height in horizontal lines, it is reset to zero for the next symbol.

The timing circuit 308 generates a data path select signal to the pixel generation circuit 312 as the output of a symbol pixel counter 318. The symbol pixel counter is compared with the cube width (m) in a comparator 319 and, when the counter reaches the extent of the symbol width, the counter 318 is reset. The counter 318 is clocked by the pixel clock signal PIXCLK.

The last signal that is generated by the timing circuit 308 is the next graphics pixel signal which is directed to the address generator circuit 310. The next graphics pixel signal is the output of an AND gate 315. The inputs to the AND gate 315 are the coincident combination of the graphics active screen signal (from AND gate 351) and the pixel clock signal, PIXCLK.

Figure 19:
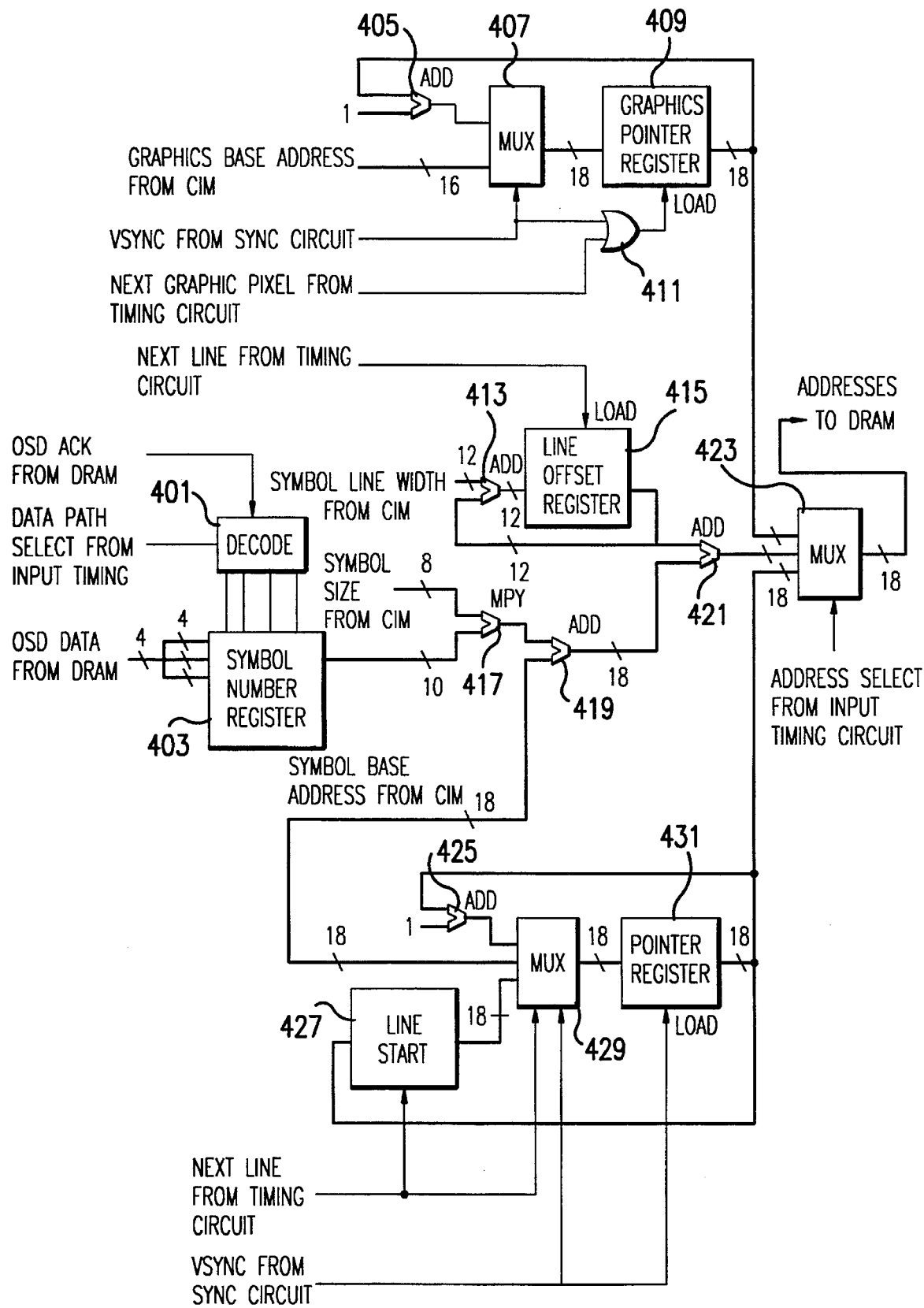

FIG. 19 is a detailed electrical schematic of the address generation circuit 310. The address generation circuit 310 generates DRAM addresses for three different types of data. The data, as has been explained previously, consists of graphics data, symbol data, and pointer data from the three areas of display memory. A multiplexer 423 selects between one of these address generators to generate the addresses of the particular data which is to be output to the DRAM 137. The address selection signals from the timing circuit 308 cause a pointer to be addressed, and then cause the symbol pointed to be addressed during a symbol screen display. Alternatively, a graphics address generator is used to address bytes from the DRAM 137 for a graphics screen display.

A pointer is addressed by the output of a pointer register 431. The pointer register 431 is initially loaded on the start of a video field (VSYNC) with a symbol base address. The symbol base address is the address of the first pointer for a symbol screen definition. This is done through one path of a three input multiplexer 429 upon the occurrence of the VSYNC signal. Pointers are addressed in this stored sequence by adding 4 nybbles for every cycle with an adder 425 which is another input to the multiplexer 429.

After a pointer address is calculated, the symbol which it points to is addressed. The data in a pointer enters from the osdDataOut path into a symbol number register 403 where it is multiplied by the symbol size in a multiplier 417. The symbol number times the symbol size when added to the symbol base address in an adder 419 yields the address of the first nybble of the symbol. This symbol data is then input symbol line by symbol line by the multiplexer 423 by adding a symbol line offset from line offset to adder 421 register 415. The line offset 415 is loaded from the next line timing signal which is the addition of the previous line and the symbol line width from an adder 413.

The graphics addressing is accomplished by a graphics pointer register 409 which is loaded through multiplexer 407 from the graphics base address register on the VSYNC signal. The graphics pointer register will then contain the address of the first byte of the graphics screen area. The multiplexer 407 is then switched to the output of an adder 405 which adds one byte to the graphics pointer register 409 for every pixel clock to sequence through the graphics addresses of the DRAM 137. The graphics pointer register 409 is incremented by the next graphics pixel signal from the timing circuit 308.

Figure 20A:
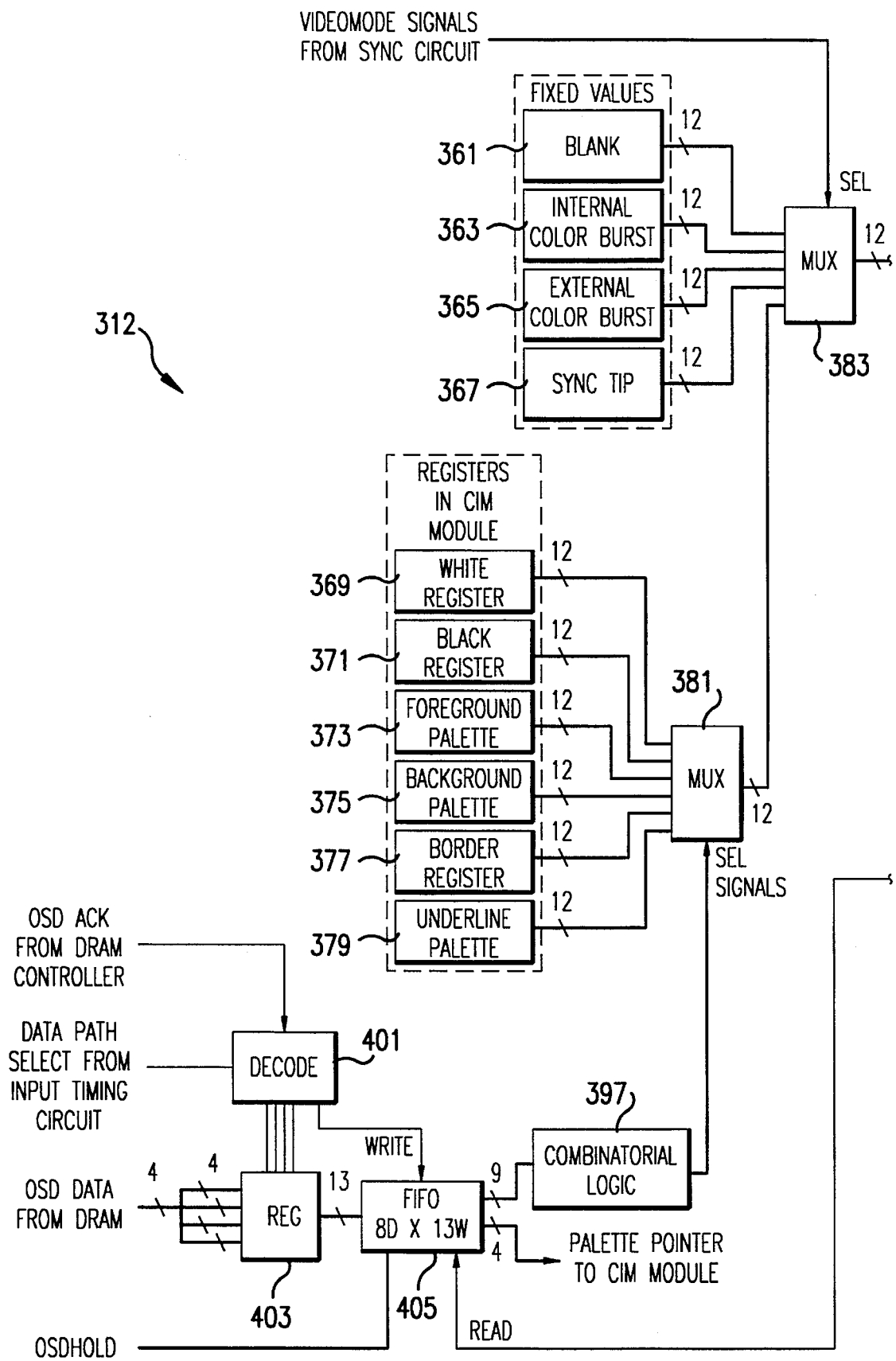

FIG. 20 illustrates a detailed schematic of the pixel generation circuit 312. The pixel generation circuit 312 is basically a circuit which generates a 12-bit digital word representative of the analog value of a pixel at a particular point in the video field. It comprises two multiplexers 381 and 383 which produce 12-bit digital words which are then output to the analog processor 300. The multiplexer 383, in response to the video mode signals from the sync circuit 304, selects either from a group of fixed values which are stored in locations 361–367 of a memory (preferably ROM) or the output of multiplexer 381. The values stored in memory locations 361–367 are digital representations for the analog blanking level 361, the internal color burst level 363, the external color burst level 365 and the sync tip level 367. During horizontal and vertical blanking intervals, these values are used to produce the analog levels necessary to output a video signal to the television receiver.

During the active video portions of horizontal lines, the multiplexer 381 is used to select between six 12-bit registers which contain the colors of a particular pixel. The multiplexer 381 can select between a color (white) from register 369; or a color (black) from register 371; the foreground palette 373 (consisting of 16 registers) or the background palette 375 (consisting of 16 registers). Otherwise, a pixel color can be provided from a border color register 377 which stores a chosen color for the border screen. Alternatively, a color from the underline palette register The selection of one of these colors is made by the multiplexer 381 from the multiple states of a selection signal from combinational logic 397. The combinational logic 397 decodes the two bit pixel attribute data in each of the pixels of the symbols to pick one out of the four choices for registers 369, 371, 373 or 375. The border register color is chosen when the border screen active signal is set. The underline palette color in register 379 is selected when the underline bit for a particular symbol is set during the last line of a symbol.

Data is input from the DRAM 137 through a register 403 which receives 4 nybbles and combines them into a 16-bit digital word. Thirteen bits of the 16-bit words are written into a FIFO buffer 405 which is thirteen bits wide and 8 words deep. The combinational logic 397 reads nine of the thirteen bits of the digital words to provide its selection logic. The other four bits of each word are directed to the palette registers to select one out of the sixteen foreground and background palette registers 373 and 375.

The output of the pixel generation circuit 312, whether it is an active video line, a sync time, or a retrace time period is a 12-bit digital word describing a color (4-bits Y, 4-bits R-Y, and 4-bits B-Y). The 12-bit digital words are multiplexed into a series of 8-bit digital word pairs by a multiplexer 385. The 8-bit digital words are stored as four bits of Y and four bits of either R-Y or B-Y. This is because the chrominance is at half the frequency of the luminance and this allows the output of the luminance value twice for every chrominance value.

Multiplexer 385 is selected with a clock signal from the output of a bistable 395 which is clocked from the pixel clock signal, PIXCLK. The output of the bistable 395 is inverted via inverter 393 and input to the D input of the device. This provides a clock signal at one-half of the pixel clock rate which alternately loads either the 4-bit values of R-Y or B-Y into the input of a FIFO buffer 387. The select signal from bistable 391 is input to the FIFO buffer 387 to identify which value is being transmitted.

The first 8-bits of output of the FIFO buffer 387 is to a multiplexer 389 which produces a 4-bit output from the 8 bit digital words coming from the buffer 387. The words for one pixel are the luminance value in one four bit word and one of the chrominance value. The next pixel is the luminance value and the other chrominance value. These are sent to the analog processor 300 as PIXD at the pixel rate by the clock provided by bistable 391.

Bits 9 and 10 output from the FIFO buffer 388 are the pixel select signal PIXSEL which determines whether the analog processor 300 outputs a display processor pixel or one from the VIDEO IN signal. PIXSEL is multiplexed with each 4-bit output word and with the luminance indicates whether the pixel is a display pixel or an active video pixel and with a chrominance value indicates whether the value is B-Y (1) or R-Y (0).

For the pixel choice situation of PIXSEL, an AND gate 437 detects the coincidence of two conditions. The first is the presence of the enable bit EN set in the control register R3 indicating the display processor should be active. The second condition is the detection of a valid color by a transparent color detection circuit 439. In the present implementation, all colors are valid except those colors which are designated as transparent. A transparent color is defined as one, as detected by comparators 431, OR gate 433, and NAND gate 435, where the luminance value Y is zero, and either of the chrominance values B-Y or R-Y are nonzero. Therefore, the pixel select signal PIXSEL is a zero state when the display processor is disabled, such that the zero state selects the VIDEO IN signal pixel. When the display processor is enabled and a valid pixel color is detected, the state will change to one to choose the output pixel of the display processor. When the display processor detects a transparent color, even when enabled, the state of PIXSEL will be zero to produce a selection of the VIDEO IN signal pixel and an active video background pixel for a display.

Figure 21:
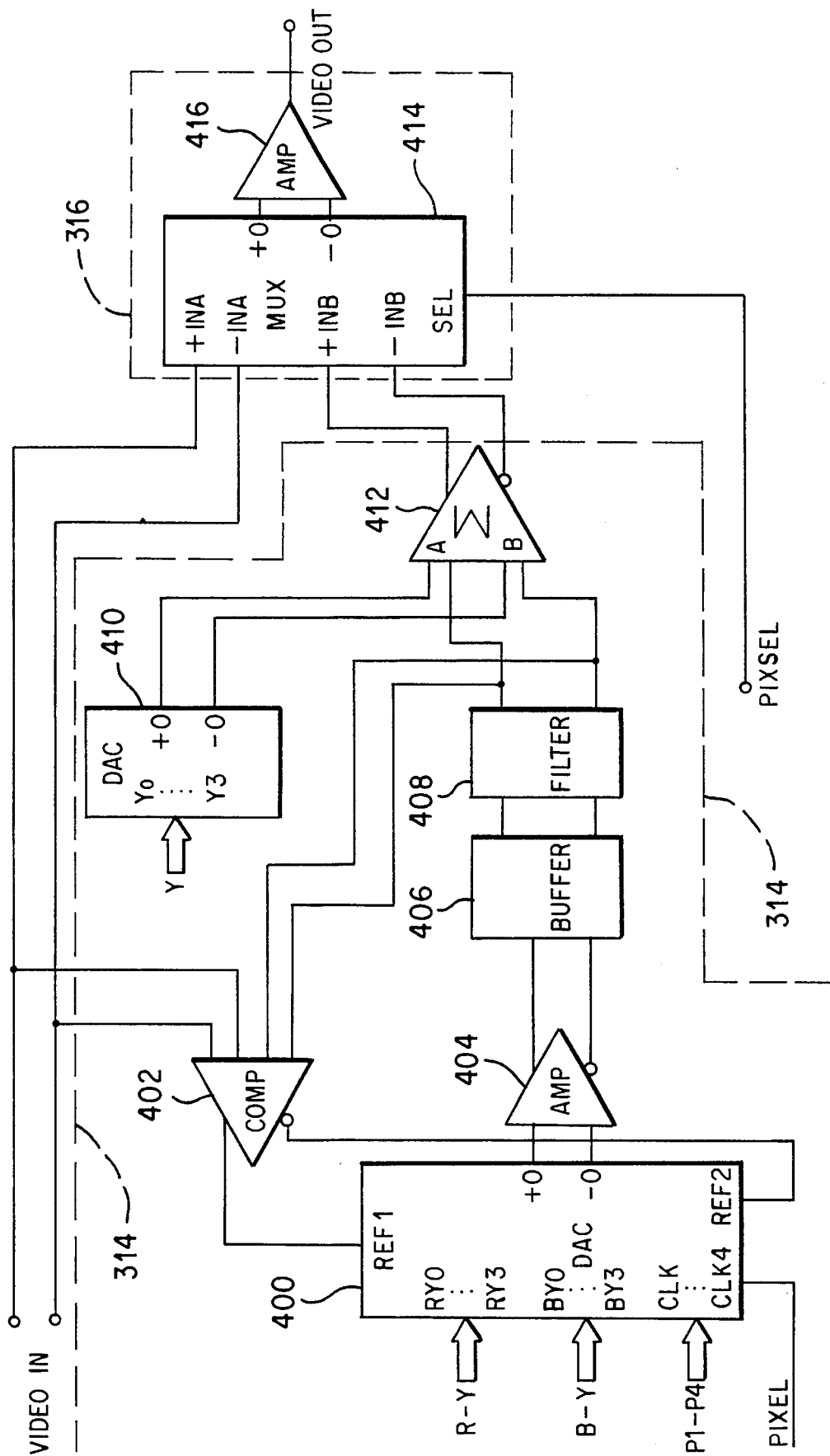
FIG. 21 is a detailed electrical schematic diagram of the various parts of the analog processor illustrated in FIG. 12.

The digital to analog pixel converter 314 and multiplexer 316 of the analog processor 300 is shown in a detailed schematic in FIG. 21. A balanced VIDEO IN signal for common mode rejection is input to one port of the analog multiplexer 414. The other port of the analog multiplexer 414 is a balanced analog signal from the pixel conversion circuit 314. The pixel conversion circuit 314 receives the 12-bit digital pixel words from the digital processor 302 and converts them into analog pixels which can be selectively substituted for the analog pixels of the VIDEO IN signal. The selection is controlled by the pixel select signal PIXSEL, which connects one of the input ports of the multiplexer 414 to the output port for one state and connects the other input port of the multiplexer 414 to the output port for the other state. The balanced output of the multiplexer 414 is linearly amplified in an amplifier 416 before being transmitted to the modulator 142 as the VIDEO OUT signal.

The pixel conversion circuit 314 performs a digital to analog conversion process where a digital pixel representing the luminance and chrominance of a pixel is converted into the analog equivalent of that pixel. The conversion circuit 314 includes a luminance digital to analog converter (LDAC) 410 and a chrominance digital to analog converter (CDAC) 400. The LDAC 410 converts the 4-bit luminance digital word Y into a DC voltage pedestal which is output in a balanced configuration to one input of an analog summation circuit 412. The CDAC 400 converts the 4-bit chroma word R-Y and 4-bit chroma word B-Y into a sinusoidal signal having a frequency of 3.58 Mhz and having a representative color phase with respect to the burst of the incoming VIDEO IN signal depending on its value.

This is the conventional chroma modulation which, when summed with the luminance pedestal in the summation circuit 42, will provide an analog pixel which can be substituted for an analog pixel of the VIDEO IN signal. The CDAC 400 generates the sinusoidal signal by converting the digital value of the R-Y and B-Y signals into a phase representation which varies with the phase of an incoming digital clock PH1–PH4, which is referenced to the color burst of the incoming VIDEO IN signal but is 4 times its frequency. The digital representation of the sinusoid at the correct phase is output from the CDAC 400 to a level adjuster and amplifier 404 which references the digital signal to video ground. The balanced output of the level adjuster 404 is buffered by a linear buffer amplifier 406 before being input to a shaping filter 408. The shaping filter 408 comprises a network of frequency responsive elements such as capacitors and inductors. The shaping filter 408 acts to convert the digital representation of the sinusoid to an analog sine wave without varying its phase. The shaping filter 408 is essentially a low pass filter with steep roll off which removes the high frequency edges of the digital signal above 3.58 Mhz burst frequency.

A comparator 402 provides a level adjustment signal for the output voltage range of the outputs from the CDAC 400. This level compensation equalizes the level input to one port of the comparator 402 from the VIDEO IN signal with the level input to the other port of the comparator 402 from the output of the conversion circuit 314. The level compensation signal is used to adjust the maximum and minimum levels for the range of analog voltages generated by the CDAC 400.

Figure 22:
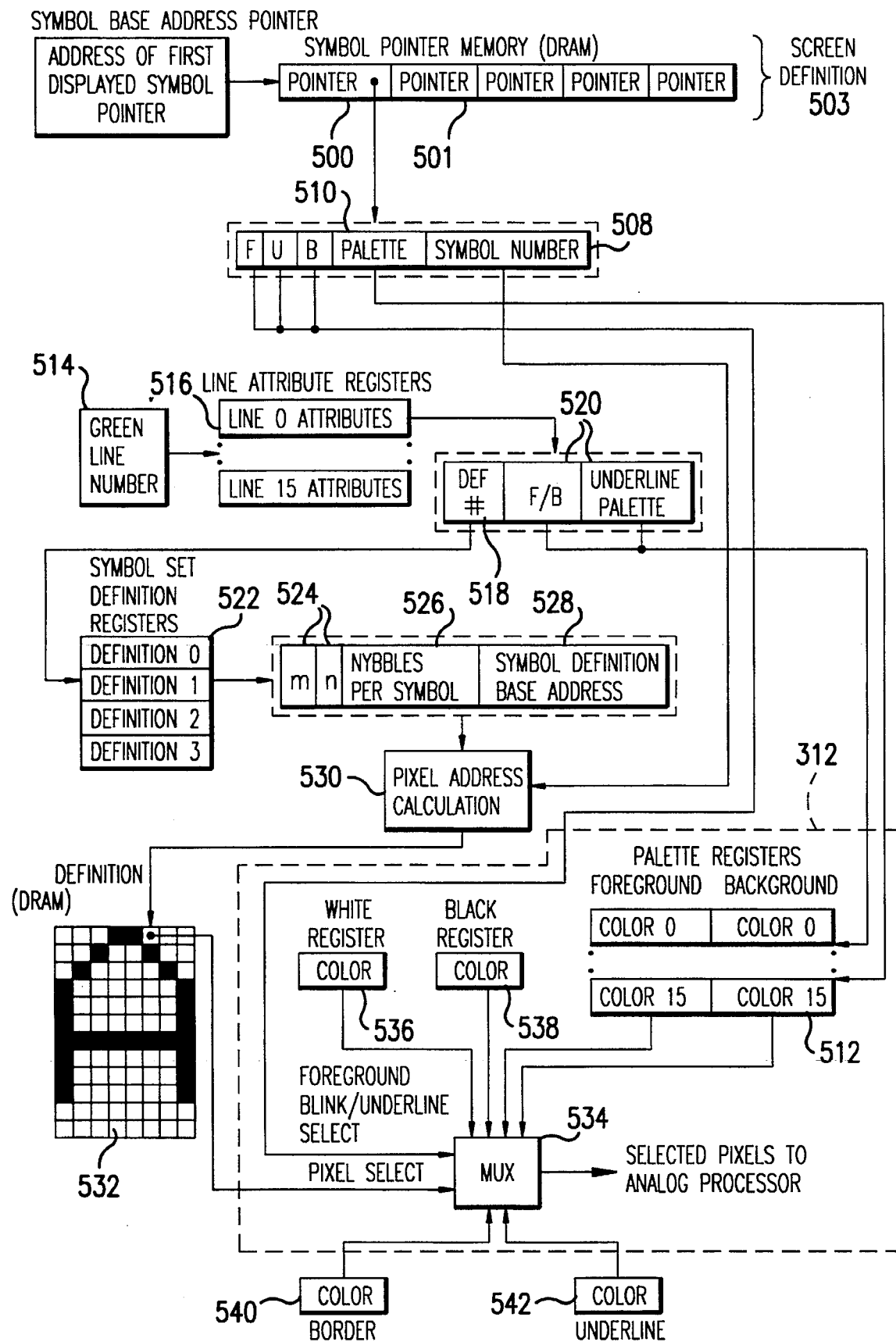
FIG. 22 is a functional flow chart illustrating the data flow for displaying symbols with the system illustrated in FIG. 11.

The data flow for the display of symbols can be more fully understood with respect to FIG. 22. At the beginning of the display of a screen, the horizontal and vertical starting points and the horizontal and vertical ending points of the screen have been loaded into the appropriate registers. Further, the symbol screen base address register has been loaded with the address of the first symbol pointer in the symbol screen definition. The symbol screen definition consists of a plurality of these pointers which are stored in the DRAM 137.

The digital processor 302 when commanded by the control processor 128 to display the symbol screen fetches the first pointer 500 from the DRAM 137. The pointer 500 contains the symbol number 508 of a symbol definition set which is sent to the pixel address calculation process of the address generator 310. The pointer also contains the choice 510 of the palette register which is transferred to the pixel generation circuit to select the one of sixteen palette register 512 combination choices available. The bits F (foreground mode), U (underline), and B (blink) are sent to the pixel generation circuit 312 for the different selections of these features. Additionally, the digital processor 302 determines from the symbol line counter the screen line number 514 which indicates which of the line attributes registers 516 should be chosen. The line attributes registers 516 have been previously programmed to select between up to four different types of symbol definition sets 518, and the color of the underline 520, if any, for the symbol. These particular line attributes are fetched and the color of the underline 520 sent to the pixel generation circuit 312 to select one of the sixteen colors of either the foreground or background palette registers 512.

The symbol set definition choice 518 is sent to the symbol set definition registers 522 and the symbol definition choice read out. The symbol set definition registers 522 contain the size of the symbol m=n 524 and the number of nybbles 526 it takes to store each symbol. The symbol definition register 522 also contains the base address of the symbol set definition 528 which, when added to the symbol number 502, will give the starting address of the particular symbol chosen for the display. The pixel address calculation process 530 causes the symbol 532 to be transferred from the DRAM 137 to the pixel generation circuit 312 where it can be applied to a multiplexer 534 having a number of inputs from the color registers 512, 536, 538, 540, and 542.

As the pixel attribute data for each pixel are read from the symbol 532, the two bits are decoded to select either the 12 bits of the foreground color, the 12 bits of a background color, the 12 bits of the black color, or the 12 bits of the white color. This normal selection process is modified by the F, U, and B bits which cause modifications of the normally selected colors.

The foreground mode (F) bit, if set, inverts the luminance (first 4 bits) of a chosen foreground color. The blink bit (B), if set, inverts the choice of the foreground color and background color during a configurable portion of the blink cycle. The underline bit, (U), if set, causes the last line of pixels in the symbol 532 to be output as the underline color 542. The pixels for each symbol 532 are read in sequence and the selection process continues until all the pixels of a particular symbol have been displayed. The digital processor 302 then returns to fetch another symbol pointer 501 from the symbol screen definitions 503. The fetching of the pointers and the display of the symbols continues in sequence until all of the symbols for the symbol screen definition 503 have been displayed.

Figure 23:
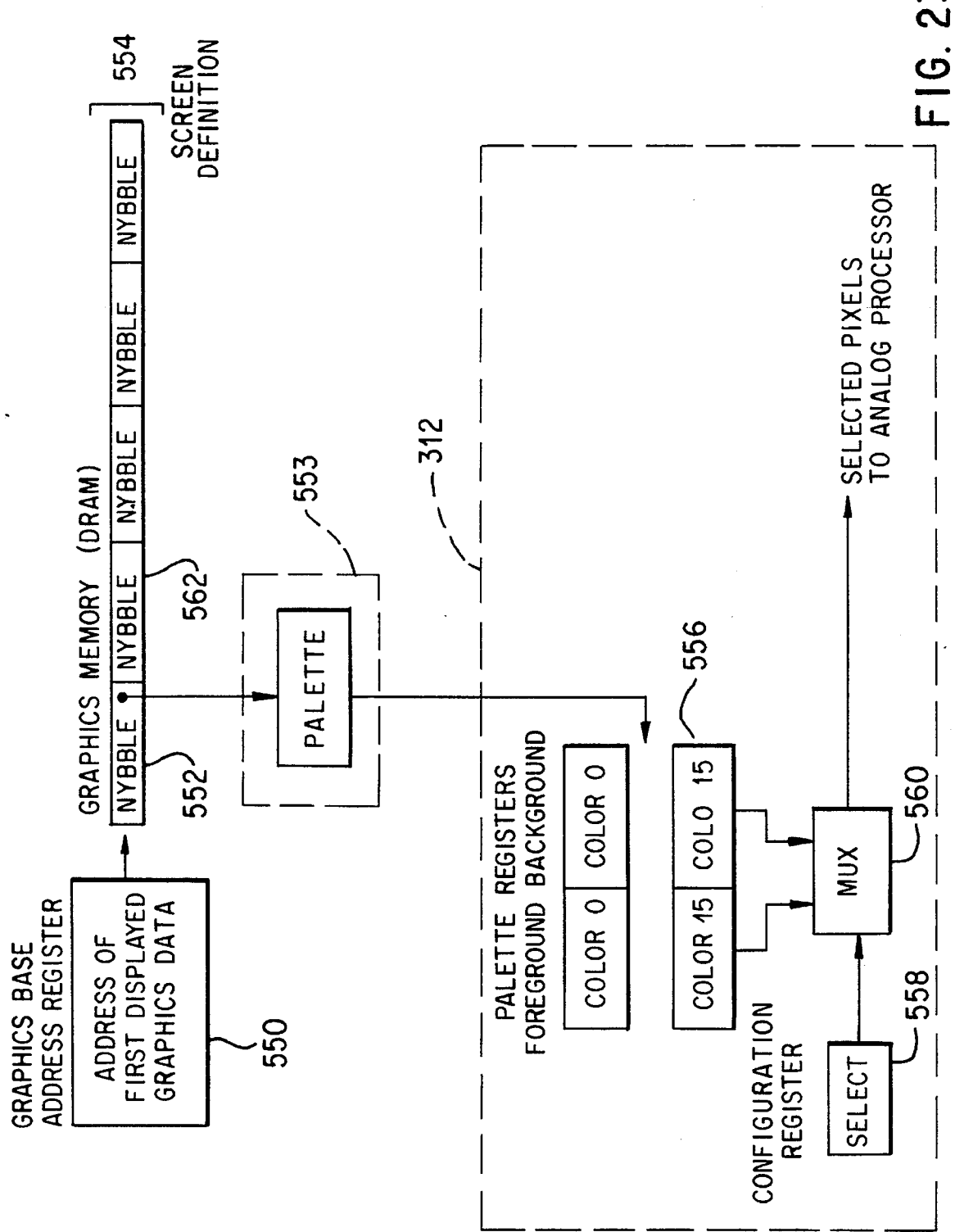
FIG. 23 is a functional flow chart illustrating the data flow for displaying graphics with the system illustrated in FIG. 11.

The data flow for the display of a graphics screen will now be more fully explained with reference to FIG. 23. At the beginning of the display of a screen, the horizontal and vertical starting points and the horizontal and vertical ending points of the screen have been loaded into the appropriate registers. Further, the graphics screen base address register 550 has been loaded with the address of the first nybble 552 of the symbol screen definition. The graphics screen definition 554 consists of a plurality of nybbles that are stored in DRAM 137, each corresponding to one of the pixels of the graphics display. The digital processor 302 when commanded by the control processor 128 to display a graphics screen fetches the first nybble 552 from DRAM 137 and transfers it to the pixel generation circuit 312. Each nybble represents one out of sixteen combinations of the palette registers 556 in a 4 bit address 553. By setting a bit in the control register 558, either the foreground color or the background color can be selected via a multiplexer 560. The nybbles 552,562, etc. are fetched in sequence and displayed until the entire graphics screen 552 has been displayed.

While there has been shown and described the preferred embodiments of the invention, it will be evident to those skilled in the art that various modifications may be made thereto without departing from the spirit and scope of the invention as set forth in the appended claims and their equivalents.

What is claimed is:

1. A display system of a subscriber terminal for use in a subscription television system, said subscriber terminal connected to a television receiver which displays the programming of the subscription television system, said display system comprising:

a memory having a first graphics screen definition portion for storing graphics data, a second symbol screen definition portion and a third symbol set definition portion, the second and third portions for storing symbol data;

a display processor for generating a fast video signal according to said symbol data and said graphics data stored in said memory; and a display multiplexer for receiving a second video signal, said second video signal originating remote from the subscriber terminal, for receiving said first video signal outputted from said display processor, and for selectively outputting a pixel of one of said first video signal and said second video signal for display on the television receiver.

2. A display system as set forth in claim 1 wherein;

said third symbol set definition portion of said memory contains more than one symbol set definition.

3. A display system as set forth in claim 2 wherein:

each symbol set definition has a plurality of characters, each defined by an m×n array of pixels, where m and n are integers.

4. A display system as set forth in claim 3 wherein:

at least one of the parameters n and m for one symbol set definition is not the same as n and m for at least one other symbol set definition.

5. A display system as set forth in claim 2 wherein:

at least one of said character set definitions has a plurality of characters defining a different language from at least one other character set.

6. A display system as set forth in claim 5 wherein:

at least one of said character set definition is English.

7. A display system as set forth in claim 5 wherein:

at least one of said character set definitions is Chinese.

8. A display system as set forth in claim 5 wherein:

at least one of said character set definitions is Arabic.

9. A display system as set forth in claim 5 wherein:

at least one of said character set definitions is Japanese.

10. A display system as set forth in claim 1 wherein:

said memory is random access memory.

11. A display system as set forth in claim 10 wherein:

said random access memory is read/write memory.

12. A display system for generating a first video signal comprising:

a memory having a first graphics screen definition portion for storing graphics data, a second symbol screen definition portion and a third symbol set definition portion, said second and third portions for storing symbol data;

display generating means for converting said symbol data and graphics data stored in said memory to pixel data;

display processing means, responsive to said display generating means, for converting said pixel data to an analog pixel signal; and display multiplexing means for generating said first video signal by multiplexing between said analog pixel signal and a second video signal on a pixel by pixel basis, said second video signal originating remote from the subscriber terminal.

13. The display system according to claim 12, said symbol data including a plurality of character sets, each of said character sets defining a plurality of characters, wherein each of said characters is defined by an m by n array of pixels.

14. The display system according to claim 13, one of said character sets being an English character set.

15. The display system according to claim 13, one of said character sets being a Chinese character set.

16. The display system according to claim 13, one of said character sets being an Arabic character set.

17. The display system according to claim 13, one of said character sets being a Japanese character set.

18. The display system according to claim 12, said display system being a subsystem of a subscriber terminal of a cable television system.

19. The display system according to claim 12 further comprising control processing means for controlling operation of said display generating means.

20. The display system according to claim 12, said display generating means converting one of said symbol data and said graphics data to said pixel data according to priority data.

21. The display system according to claim 12, said display processing means having pixel conversion means for converting said pixel data to said analog pixel signal, and said display multiplexing means having analog multiplexing means, responsive to said display generating means, for multiplexing between said analog pixel signal and said second video signal.

22. The display system according to claim 21, said pixel data including luminance data and chrominance data, and said pixel conversion means including first digital to analog converter means for converting said luminance data to a luminance signal having a representative DC voltage level, second digital to analog converter means for converting said chrominance data to a sinusoidal chrominance signal having a representative color phase, and analog summation circuit means for summing said luminance signal with said chrominance signal to form said analog pixel signal.

23. The display system according to claim 12 further comprising a clock generation circuit means for generating a pixel clock signal having a plurality of cycles, wherein each cycle of said pixel clock signal represents a single pixel.

24. The display system according to claim 23, said clock generation circuit synchronizes said pixel clock signal with a horizontal synchronization pulse of said second video signal.

25. The display system according to claim 24, said clock generation circuit synchronizing said pixel clock signal with said horizontal synchronization pulse of said second video signal using a synchronization slicer circuit and a phase-lock loop circuit.

26. The display system according to claim 23, said display generating means having:

synchronization circuit means for generating a first horizontal synchronization signal, a vertical synchronization signal, a pixel number signal, and a line number signal in accordance with said pixel clock signal, and for generating a video mode signal that defines a sync tip timing, a color burst timing, a horizontal blanking timing, and a vertical blanking timing in accordance with said first horizontal synchronization signal, said vertical synchronization signal, said pixel number signal, and said line number signal; and pixel generation circuit means for receiving said video mode signal from said synchronization circuit means and for converting said symbol data and said graphics data to said pixal data according to said video mode signl.

27. The display system according to claim 26 further comprising means for synthesizing a second horizontal synchronization signal synchronized with a horizontal synchronization pulse of said second video signal, wherein said synchronization circuit means synchronizes said first horizontal synchronization signal, said vertical synchronization signal, said pixel number signal, and said line number signal with said second horizontal synchronization signal.

28. The display system according to claim 26, said synchronization circuit means having a pixel counter and a horizontal line counter.

29. The display system according to claim 26, said pixel generation circuit means having means for detecting when said pixel data represents a transparent color and for controlling said video processing means to select said second video signal when said pixel data representing said transparent color is detected.

30. The display system according to claim 26 further comprising a memory interface circuit and address generation circuit that operate cooperatively to supply said symbol data and graphics data to said pixel generation circuit means.

31. The display system according to claim 19, said display generating means having a control interface circuit means for providing said control processing means access to configuration registers.

32. A method for use in a display system for generating a first video signal, the display system having a memory with a first graphics screen definition portion for storing graphics data, a second symbol screen definition portion and a third symbol set definition portion, the second and third portions for storing symbol data, said method comprising the steps of:

converting one of said symbol data stored in said second and third portions of said memory and said graphics data stored in said first portion of said memory to pixel data;

converting said pixel data to an analog pixel signal; and generating said first video signal by multiplexing between said analog pixel signal and a second video signal on a pixel by pixel basis, said second video signal originating remote from the subscriber terminal.

33. The method for use in a display system according to claim 32, said symbol data including a plurality of character sets, each of said character sets defining a plurality of characters, wherein each of said characters is defined by an m by n array of pixels.

34. The method for use in a display system according to claim 33, one of said character sets being an English character set.

35. The method for use in a display system according to claim 33, one of said character sets being a Chinese character set.

36. The method for use in a display system according to claim 33, one of said character sets being an Arabic character set.

37. The method for use in a display system according to claim 33, one of said character sets being a Japanese character set.

38. The method for use in a display system according to claim 32, said display system being a subsystem of a subscriber terminal of a cable television system.

39. The method for use in a display system according to claim 32, said converting of one of said symbol data and said graphics data to said pixel data is performed according to priority data.

* * * * *